Sept. 20, 1966   H. R. DZIEDZIC ET AL   3,273,235
AUTOMATIC TOOL CHANGING APPARATUS Filed May 11, 1964   12 Sheets-Sheet 1

INVENTORS
Harry R. Dziedzic and
Richard A. Jerue
By Brown, Jackson,
Boettcher & Dienner Attys.

INVENTORS
Harry R. Dziedzic
and Richard A. Jerue
By Brown, Jackson,
Boettcher & Dienner Attys.

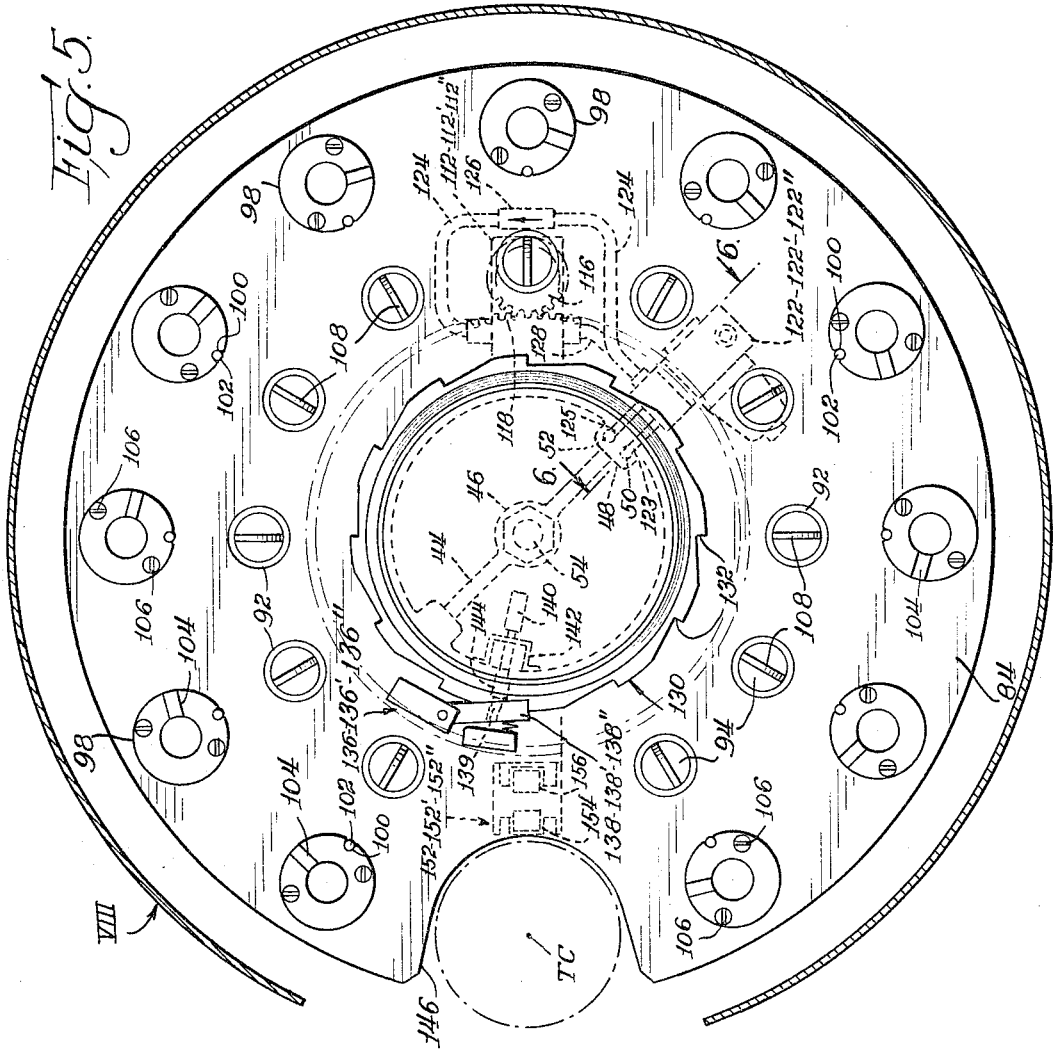

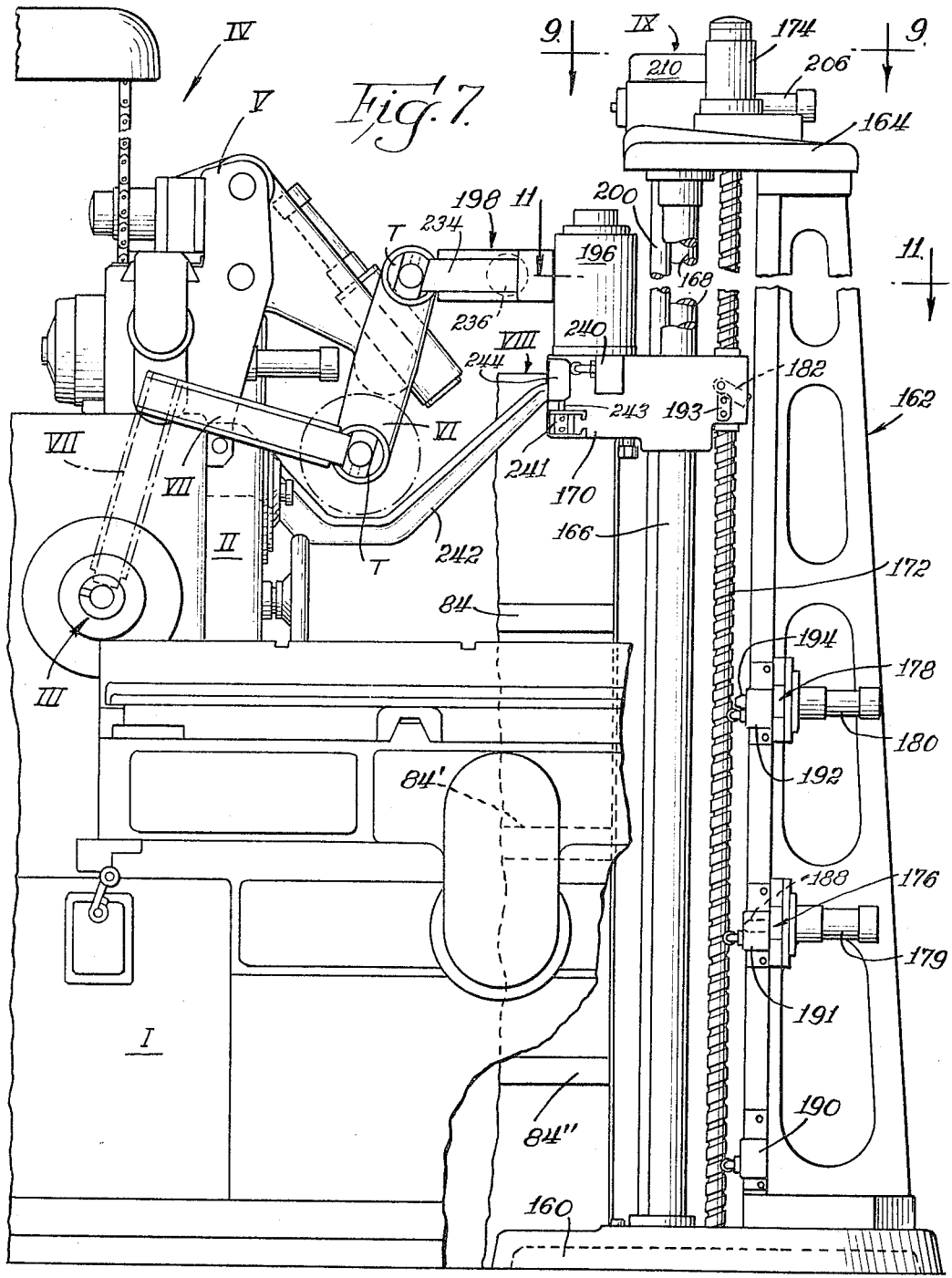

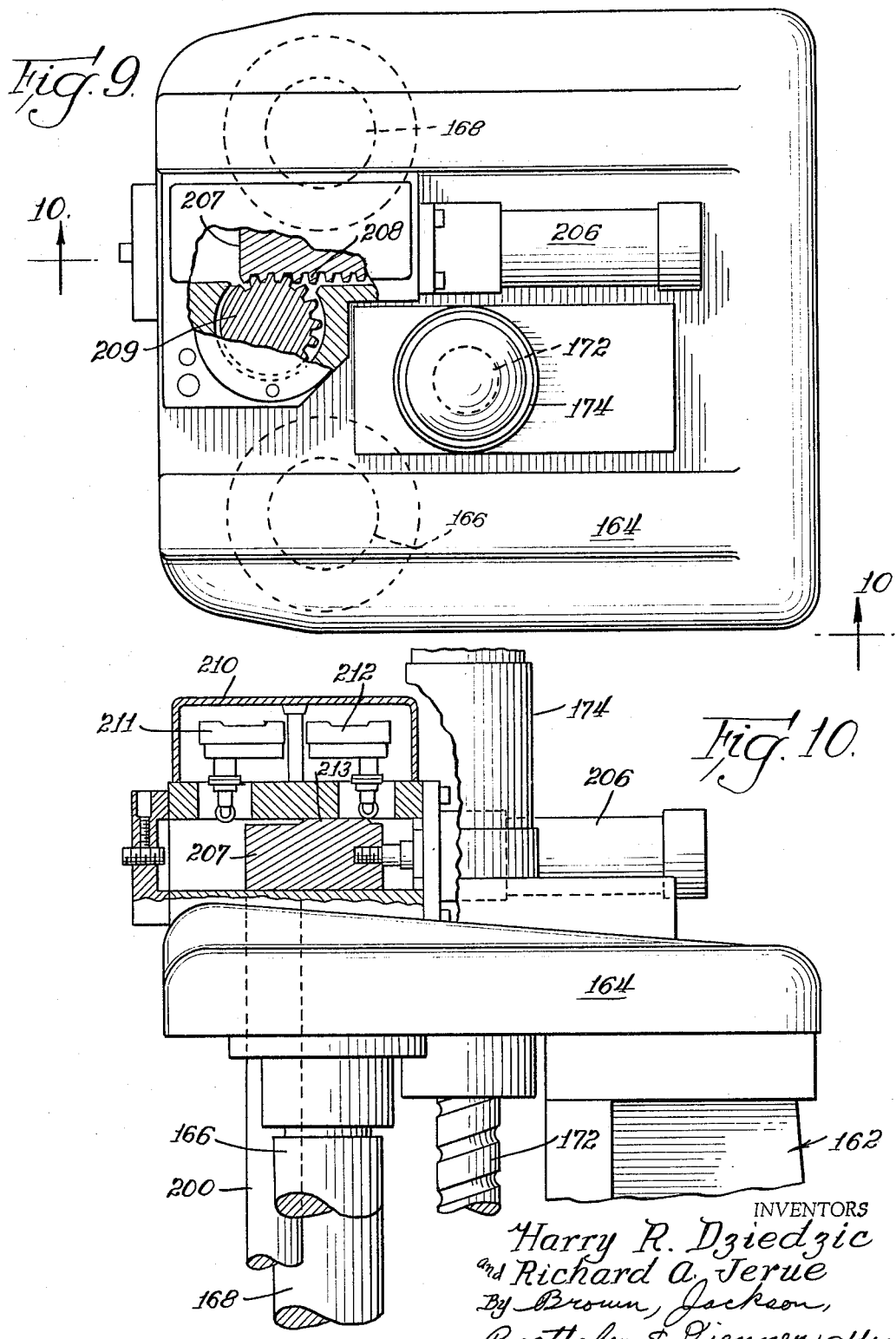

Sept. 20, 1966  H. R. DZIEDZIC ET AL  3,273,235
AUTOMATIC TOOL CHANGING APPARATUS
Filed May 11, 1964  12 Sheets-Sheet 9

INVENTORS
Harry R. Dziedzic
and Richard A. Jerue
BY Brown, Jackson,
Boettcher & Dienner attys.

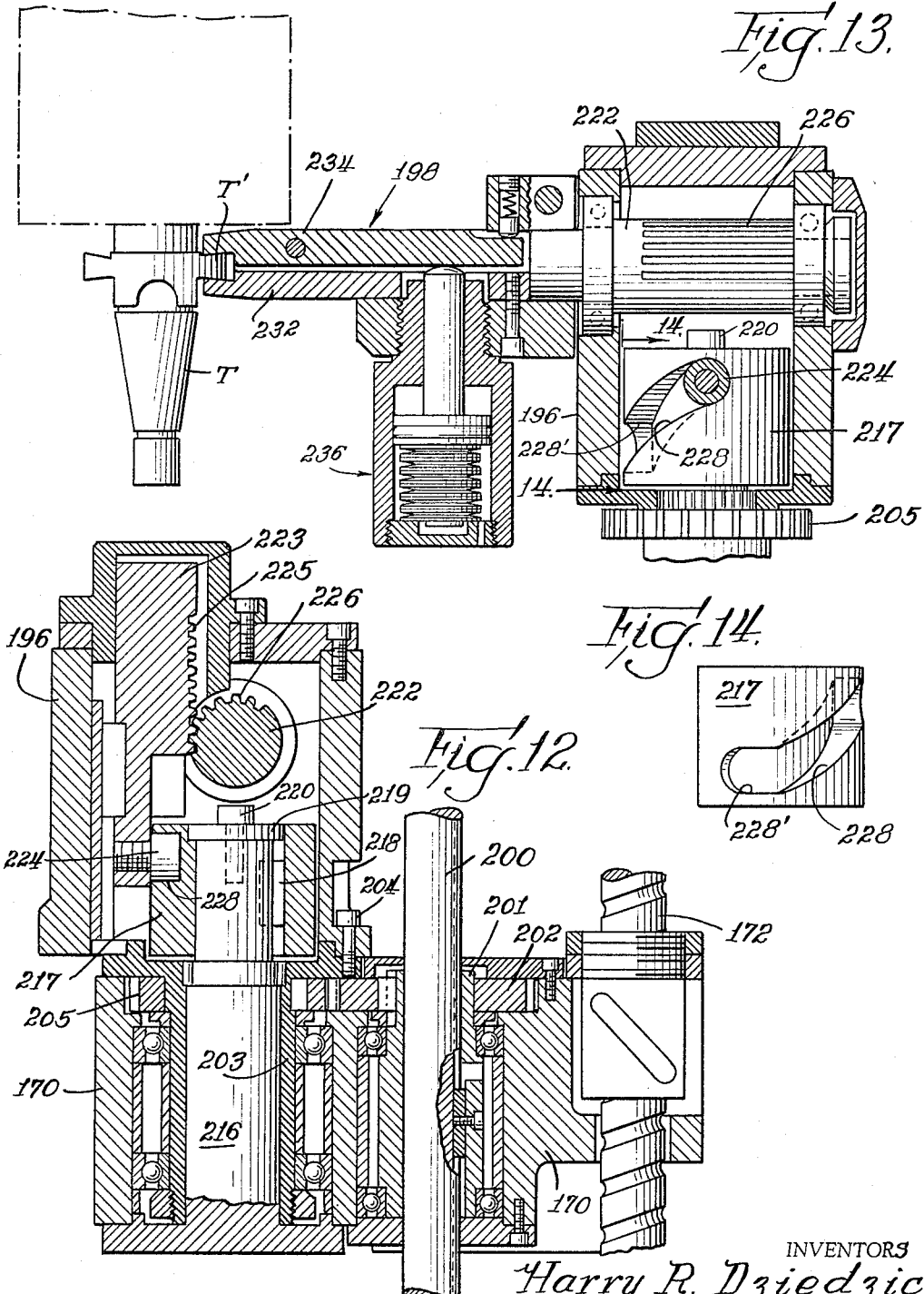

INVENTORS
Harry R. Dziedzic and
Richard A. Jerue
By Brown, Jackson,
Boettcher & Dienner Attys.

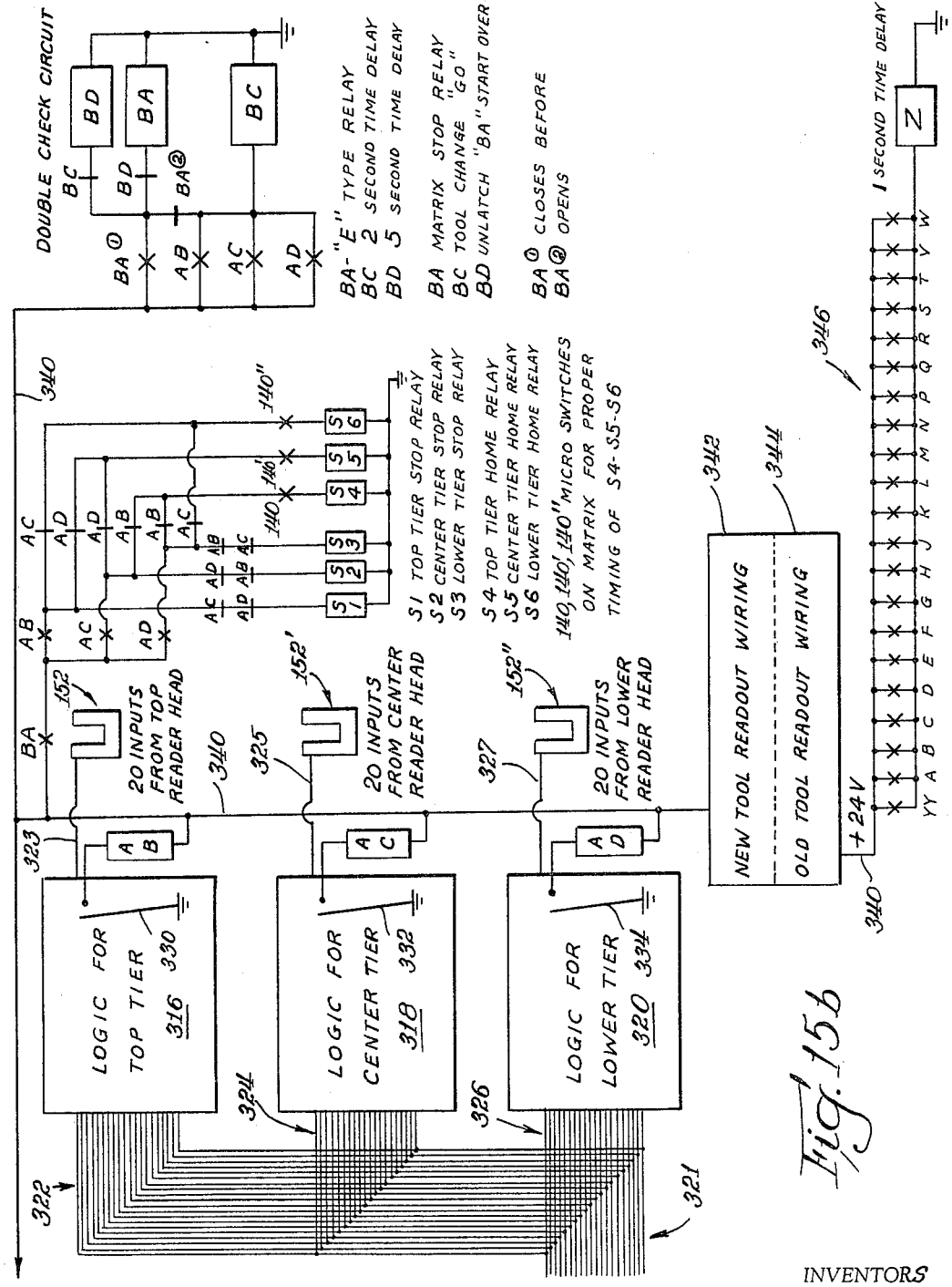

United States Patent Office

3,273,235
Patented Sept. 20, 1966

3,273,235
AUTOMATIC TOOL CHANGING APPARATUS
Harry R. Dziedzic, Glenview, Ill., and Richard A. Jerue, Birmingham, Mich., assignors to Scully-Anthony Corporation, a corporation of Illinois
Filed May 11, 1964, Ser. No. 366,443
12 Claims. (Cl. 29—568)

The present invention relates to automatic tool changing apparatus adapted to be employed in conjunction with a machine tool to automatically transfer a plurality of tools seriatim from a storage area to a spindle or work station and subsequently back again to the storage area, such apparatus being especially suited for use in conjunction with data controlled machine tools.

More specifically, it is an object of the present invention to provide an improved shuttle mechanism for use in an automatic tool changing system, and also to provide control mechanism for regulating the operation of the shuttle and of an associated multi-tier tool storage matrix.

The foregoing and other objects and advantages of the invention will be apparent from the following description thereof.

Now in order to acquaint those skilled in the art with the manner of utilizing and practicing the invention, there is described below, in conjunction with the accompanying drawings, certain preferred embodiments of the invention.

In the drawings:

FIGURE 5 is a top plan view of the tool storage matrix looking substantially in the direction of the arrows 5—5 of FIGURE 4;

FIGURE 6 is a fragmentary vertical section, taken substantially along the line 6—6 of FIGURE 5, showing in particular a hydraulic valve for a tier drive motor and oil passages in communication therewith;

FIGURE 7 is an elevational view, looking substantially in the direction of the arrows 7—7 of FIGURE 2, showing in particular horizontal and vertical shuttle members arranged to transfer tools from one to the other, the vertical shuttle being shown broken and thereby shortened vertically;

FIGURE 9 is an enlarged top plan view of the vertical shuttle, partly broken and in section, looking substantially in the direction of the arrows 9—9 of FIGURE 7 and illustrating mechanism for rotating the shuttle housing about a vertical axis;

FIGURE 10 is a fragmentary elevational view, partly in section, of the upper end of the vertical shuttle, the view being taken substantially along the line 10—10 of FIGURE 9;

FIGURE 12 is a vertical section through the housing of the vertical shuttle taken substantially along the line 12—12 of FIGURE 11 and showing mechanism for rotating the shuttle housing about a vertical axis and for rotating gripping means carried on the housing about a horizontal axis;

FIGURE 13 is a fragmentary vertical section taken substantially along the line 13—13 of FIGURE 11 showing the vertical shuttle gripping means and mechanism for rotating the same about a horizontal axis;

FIGURE 14 is a fragmentary elevational view looking substantially in the direction of the arrows 14—14 of FIGURE 13 and showing cam mechanism utilized for rotating the shuttle gripping means about a horizontal axis; and FIGURES 15a and 15b taken together comprise a schematic wiring diagram illustrating the electrical control system for the matrix and shuttle components.

*Automatic tool changing system*

Before describing in detail a preferred embodiment of the present invention, it is believed desirable to first describe in a general way the manner in which the vertical shuttle and tool storage matrix of the present invention may be used in conjunction with other tool transfer components to provide a complete automatic tool changing system for a date controlled machine tool.

Figure 1:
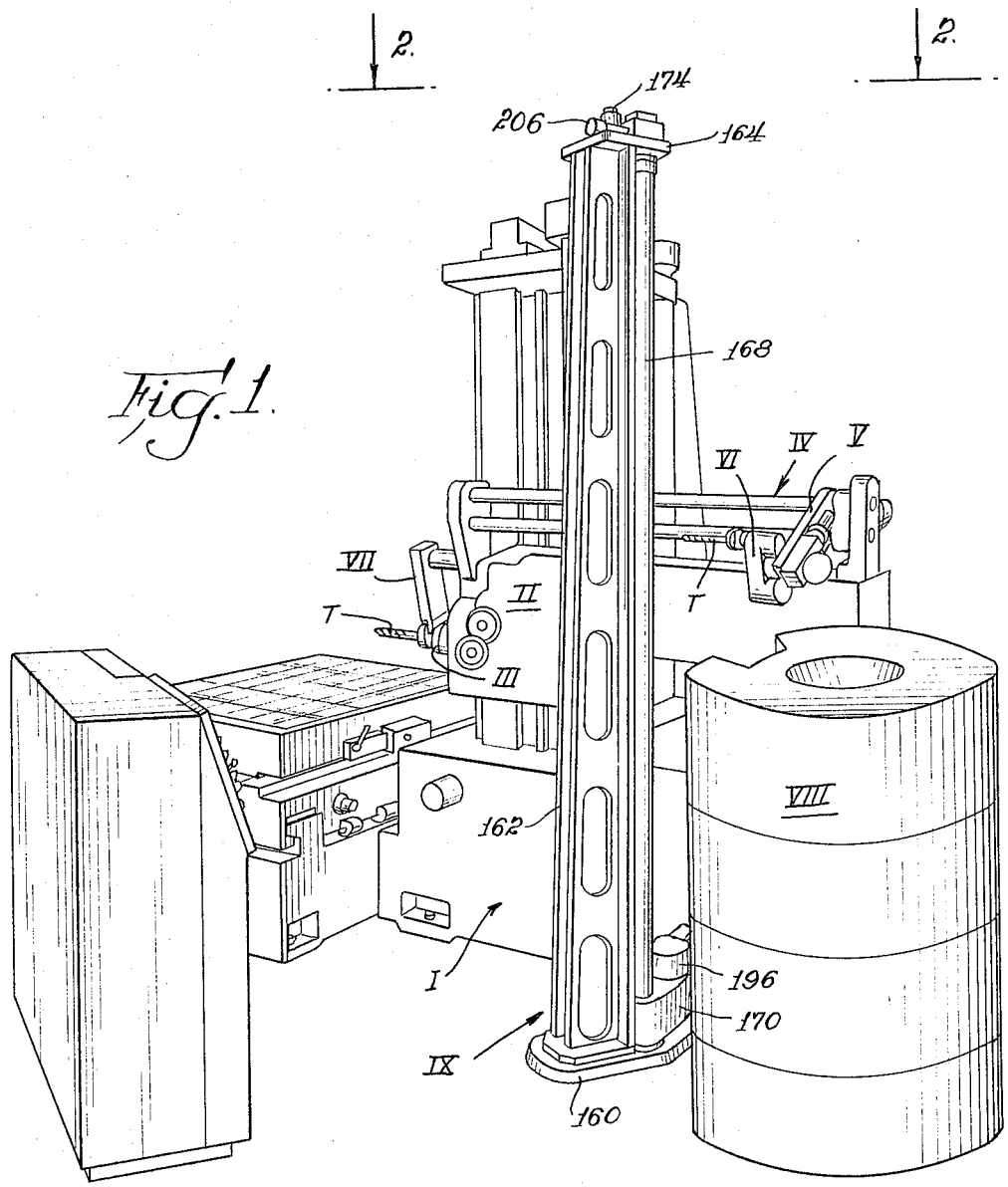
FIGURE 1 is a perspective view of a machine tool equipped with an automatic tool changing system including the vertical shuttle means of the present invention.

Referring now to the drawings, FIGURE 1 shows a machine tool I having a vertically movable head portion II, and there are also shown machine tool spindle III and a horizontal shuttle IV both of which are carried by the head for movement vertically therewith. A horizontally movable carriage V comprises a portion of the horizontal shuttle IV, and mounted on the carriage is a rotary exchange VI having a pair of tool receiving sockets. A tool change arm VII which is both rotatable and axially movable is provided for transferring tools between the machine tool spindle III and the rotary exchanger VI.

The foregoing components, certain of which are described more fully in copending applications to be identified later herein, are particularly suitable for use in conjunction with the apparatus of the present invention such as the tool storage matrix indicated at VIII and the vertical shuttle indicated at IX.

The terms "tool" and "tool holder" are used interchangeably herein. Tool holders of a type suitable for use in conjunction with the present invention are fully described in the copending application of Myron L. Anthony and Bernard R. Better, entitled Apparatus and Method for Automatic Tool Changing, Serial No. 178,060, filed March 7, 1962, and assigned to the assignee of the present invention. Briefly, such tool holders, indicated at T herein, include a pair of oppositely disposed flange portions or the like which extend generally radially outwardly from the tool holder body. As is described in the foregoing application, such flanged tool holders T can be transferred from one position to another by a transfer member having gripping means such as jaws or the like adapted to grip the flange by applying gripping pressure to the opposite faces of a flange portion, such gripping pressure being applied through movement of the gripping jaws in a direction generally parallel to the axis of the holder.

Describing briefly the cooperation of the various components of the automatic tool changing system shown in FIGURE 1, the tool storage matrix VIII is adapted to store a plurality of tools T in each of several tiers of the matrix, as will be explained more fully hereinafter. The matrix positions the next programmed tool in a predetermined tool change position depending upon the particular tier in which such tool is located, and the vertical shuttle IX removes the desired tool from the matrix and moves it upwardly. The vertical shuttle IX orients the selected tool so that it is parallel to the axis of the spindle III, and the tool is then transferred to the exchanger VI on the horizontal shuttle IV. It will be understood that the horizontal shuttle IV is movable vertically with the head II of the machine tool, and it is therefore not necessary to return the head II to a predetermined reference position in order to effect transfer of a tool T between the vertical shuttle IX and the horizontal shuttle IV. A copending application of Myron L. Anthony, entitled Automatic Tool Handling Apparatus, Serial No. 224,058, filed September 17, 1962, now Patent No. 3,161,951, and assigned to the assignee of the present invention, provides a full description of the manner in which a tool may be transferred from a vertical shuttle having flange gripping means thereon to a horizontal shuttle which is mounted on a vertically movable machine tool head and which is provided with a socket for receiving the shank of a tool or tool holder.

Once a selected tool T has been transferred to the exchanger VI on the horizontal shuttle IV, the horizontal shuttle transports the tool to an interchange position at the forward end of the shuttle. While the new tool is being transferred forwardly, the tool change arm VII is adapted to remove the old tool from the machine tool spindle III and to transfer that tool to the interchange position. Accordingly, the tool change arm VII can transfer the old tool to the exchanger VI and receive the new tool therefrom, after which the tool change arm automatically transfers the new tool to the spindle III while the horizontal shuttle IV transfers the old tool back to the vertical shuttle IX for return to the matrix VIII. The operation of the horizontal shuttle IV, the exchanger VI and the tool change arm VII is fully described in a copending application of Myron L. Anthony, entitled Automatic Tool Changing Apparatus, Serial No. 274,414, filed April 22, 1963, now Patent No. 3,233,321, and assigned to the assignee of the present invention.

Having described generally one particular example of the manner in which the matrix VIII and vertical shuttle IX may be used in cooperation with other components of an automatic tool changing system, there will now be described in detail a preferred embodiment of the tool storage matrix of the present invention.

*Tool storage matrix*

Figure 3:
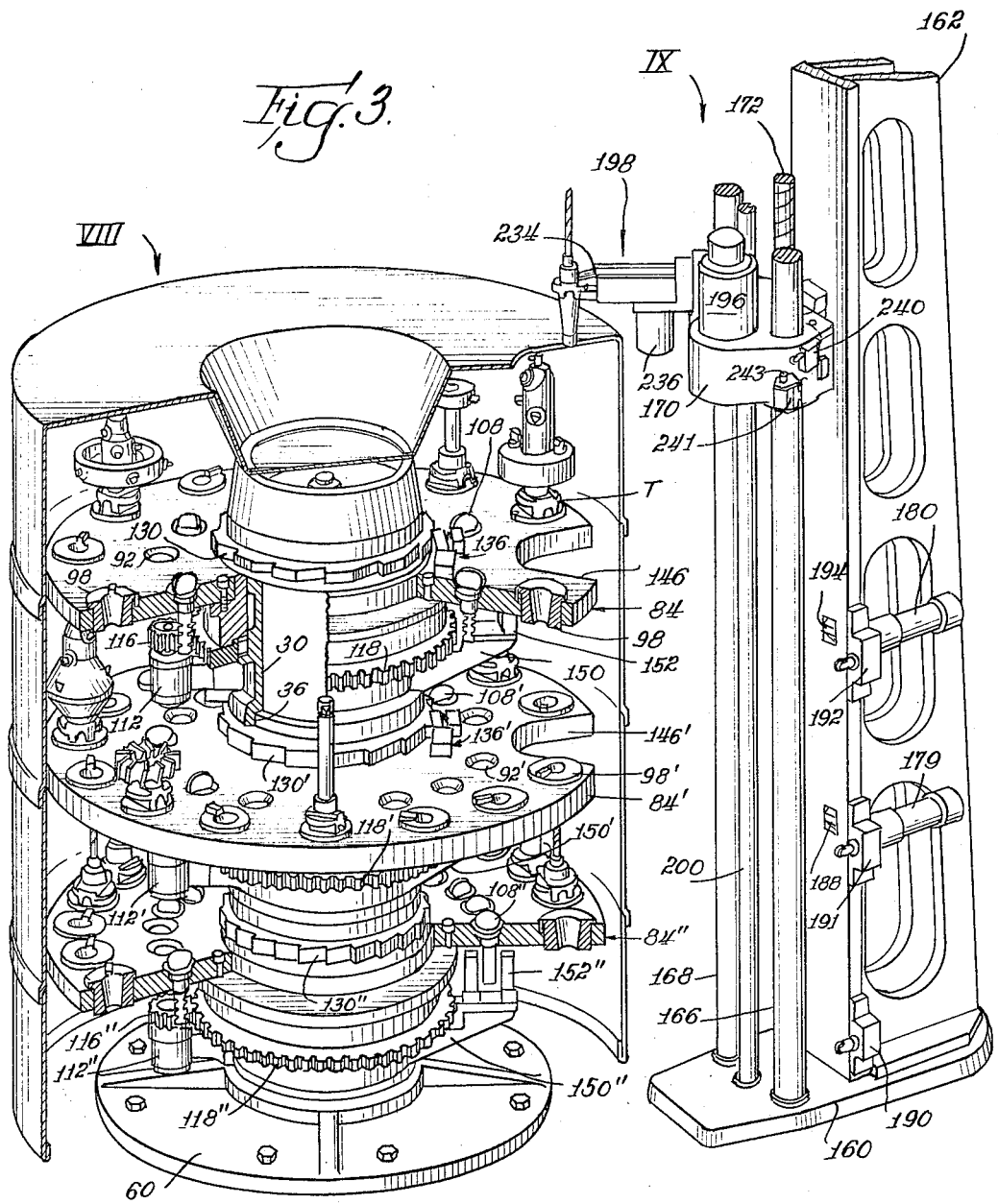
FIGURE 3 is an enlarged perspective view, partly broken away and partly in section, illustrating the tool storage matrix and vertical shuttle of FIGURE 1.
Figure 4:
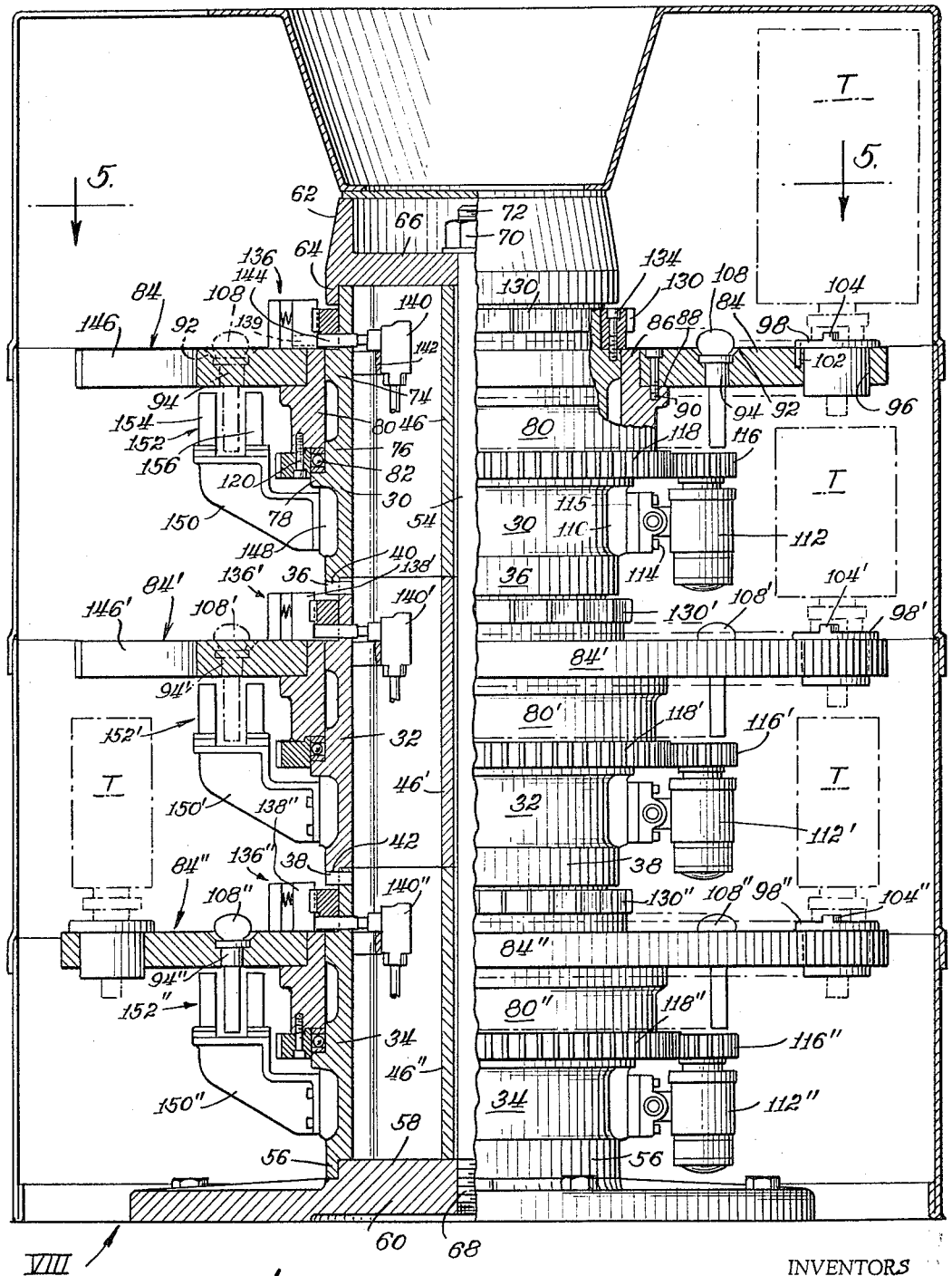
FIGURE 4 is an elevational view, partly in section, taken substantially along the line 4—4 of FIGURE 2 showing the tier-type tool storage matrix.

Referring now to FIGURES 3, 4 and 5, there are shown three stationary support housings comprising an upper support housing 30, a center support housing 32 and a lower support housing 34. The lower end of the upper support housing 30 has an annular flange or sleeve 36 which fits over the upper end of the center support housing 32, and in a similar fashion the lower end of the center support housing 32 is provided with an annular flange or sleeve 38 which fits over the upper end of the lower support housing 34. In addition, the upper and center support housings 30 and 32 are keyed together by key means such as indicated at 40, and the center and lower support housings 32 and 34 are keyed together by key means such as indicated at 42, whereby the three support housings are interlocked in axial alignment with one another, one on top of the other, and such housings are oriented rotationally in a predetermined manner relative to one another due to the key means 40 and 42.

As best shown in FIGURE 5 in connection with the upper housing 30, each of the three support housings 30, 32 and 34 is provided with a web or rib 44 which extends diametrically across the interior of the housing and which includes at its center an integral hub member 46 which is concentric with the common vertical axis of the support housings. One side of the web 44 joins the wall of the support housing 30 at a vertical rib or boss 48, and provided in the boss 48 are a pair of vertical oil passages 50 and 52. The function of the passages 50 and 52 will be explained in greater detail hereinafter, but it may here be noted that each of the three support housings 30, 32 and 34 is provided with two such parallel passages, and due to the rotational orientation of the three support housings, the passages in each support housing are in vertical alignment with the passages in the other housings so as to communicate with one another and thereby provide for continuous flow of oil through the passages in the three housings.

FIGURE 4 shows the three central hub members 46, 46' and 46'' in axial alignment with one another so as to permit a tie bar or rod 54 to be passed therethrough. The lower end of the lower support housing 34 is provided with an annular flange 56 which fits over a raised circular portion 58 on a base member 60, and a cover cap member 62 is provided with an annular flange 64 at its lower end which fits over the upper end of the upper support housing 30. The cover cap 62 includes a flat horizontal wall portion 66 having a central opening to accommodate the tie rod 54. Accordingly, the tie rod 54 is passed through the cover cap 62 and the three support housings 30, 32 and 34, and a threaded lower end 68 is threaded into the base 60. In addition a nut 70 is threaded on the upper end 72 of the tie rod so as to bear against the wall portion 66 of the cover cap. In this manner, the three support housings 30, 32 and 34, together with the cover cap 62 and base member 60, are connected together to form a rigid stationary support housing assembly.

The upper support housing 30 has a pair of vertically spaced annular ribs 74 and 76 (best shown in FIGURE 4) which extend around the outside of the housing, and the lowermost rib 76 includes a radially projecting peripheral bearing support 78. An upper drive housing 80 comprising a ringlike member or sleeve is mounted over the upper support housing 30 so as to be rotatable around the outside of the ribs 74 and 76, and a thrust bearing 82 is mounted on the peripheral support 78 so as to comprise a bearing support for the upper drive housing. Accordingly, the drive housing 80 is rotatable on the stationary upper support housing 30.

An upper tier or tool storage matrix plate 84 is mounted over a hub 86 on the upper drive housing 80 so as to rest on an annular shoulder 88 thereof, and the tier is secured to the drive housing by a plurality of circumferentially spaced socket head screws 90. The upper tier 84 generally comprises a circular disc member with a central aperture to receive the hub 86. The tier 84 has a plurality of openings 92 arranged in a circle and spaced from one another so as to accommodate a plurality of code key cartridges 94, the cartridges being fixedly mounted in the openings 92. In addition, the tier 84 is provided with a plurality of openings 96 arranged in a larger diameter circle which is concentric relative to the vertical axis of the tier, and such openings are for the purpose of accommodating a plurality of tool sockets 98. Each socket 98 is provided with a vertical slot 100 in its periphery (see FIGURE 5) which receives a pin 102 fixed relative to the tier 84 so as to rotationally orient the socket relative to the tier. Furthermore, each socket 98 is provided with a key 104 adapted to project into a key slot which may be formed in each of the tool holders T so as to orient each tool holder relative to the socket in which it is positioned. The sockets 98 are each secured to the matrix plate or tier by any suitable means such as the screws indicated at 106.

It will be understood from FIGURE 5 that each tool socket 98 is associated with a corresponding one of the code key cartridges 94 which is in radial alignment herewith. The function of the cartridges 94 will be described more fully hereinafter, but it will here be noted that a tool is positioned in one of the sockets 98 simply by lowering the tool therein without need for any latching or holding means, and when a tool is thus stored in a given one of the sockets, a key 108 which bears a code identifying such tool is inserted and turned in the corresponding cartridge 94 so as to identify the tool in the adjacent socket.

From the foregoing it can be seen that the upper tier 84 is mounted for rotation about a vertical axis with the upper drive housing 80, and the drive means for rotating such tier will now be described. A pad 110 is cast on one side of the upper support housing 30, and a hydraulic motor 112 is connected to the support housing at such pad by a plurality of bolts or the like 114, a spacer 115 being provided between the housing pad 110 and the motor bracket. The hydraulic motor 112 has a drive gear 116 associated therewith, and the drive gear 116 is positioned in driving relationship with a large diameter gear 118 which is in the form of a ring and is secured to the underside of the drive housing 80 by a plurality of socket head screws 120. The hydraulic motor 112 is reversible, and accordingly it is adapted to drive the rotatable upper tier or matrix plate 84 in either direction.

FIGURE 5 shows the tier drive motor 112 mounted on the side of the upper support housing 30, and it further shows a hydraulic valve 122 which is mounted on the support housing for controlling the flow of oil to the motor. The previously described vertical oil passages 50 and 52 in the three support housings 30, 32 and 34 communicate with a pair of radial passages 123 and 125 in the upper support housing 30 which extend to the valve 122. The valve 122 is a two position valve, forward and reverse, and one side of the valve is always open. The valve 122 is preferably solenoid operated and biased to reverse drive position so that actuation of the solenoid is required to initiate forward drive. A reverse flow conduit is indicated at 124 and includes therein a flow control valve or restrictor 126, and a forward flow conduit which is vertically spaced from the reverse flow conduit is shown at 128. Accordingly, taking vertical passage 50 as the supply passage and 52 as the return passage, when the valve 122 is in its forward position oil will flow from passage 50 through radial passage 123 into the valve 122 and then through the conduit 128 to the motor 112 to drive the latter in a forward direction and the oil will flow from the motor back to the valve and through radial passage 125 to return passage 52. Such forward driving of the motor 112 corresponds with a counterclockwise rotation of the motor drive gear 116 (when viewed from above as in FIGURE 5), whereby the upper tier 84 will be rotated in a clockwise direction. On the other hand, when the valve 122 is in its reverse position, oil will flow from passage 50 through radial passage 123 into the valve and then through the reverse conduit 124 and flow restrictor 126 to the motor 112 to drive the latter in a reverse direction, and the oil will flow from the motor back to the valve and through radial passage 125 to return passage 52. The flow restrictor 126 in the reverse conduit 124 will cause the upper tier 84 to rotate at a substantially reduced rate of speed in the reverse or counterclockwise direction.

An index plate 130 is associated with the upper support housing 30 to provide for accurate positioning of the upper tier 84 when the latter is stopped. The index plate 130 is in the form of a ring having a plurality of ratchet teeth 132 formed on the outside thereof (see FIGURE 5), and the index plate is mounted over the outside of the support housing 30 so as to rest on an annular shoulder at the top of the annular rib 74, the plate being secured to such rib of the support housing by a plurality of socket head screws such as indicated at 134. It should be noted that the number of ratchet teeth 132 formed on the upper index plate 130 corresponds with the number of tool sockets 98 and key code cartridges 94 provided on the upper tier 84.

A latch assembly 136 is mounted on the upper tier 84 for cooperation with the index plate 130. The latch assembly 136 includes a pivotally mounted latch finger 138 which is spring loaded against the index plate 130. When the upper tier 84 is being rotated in its forward or clockwise direction, the latch finger 138 will ride over the several ratchet teeth 132 one after the other without interfering with the rotation of the tier. However, when the tier is rotated at a reduced rate of speed in the reverse or counterclockwise direction, the latch finger 138 will engage against the adjacent ratchet tooth 132 on the index plate so as to stop the tier. Accordingly, the upper tier 84 is rotated in a forward direction by moving the associated motor valve 122 to its forward drive position, and when the valve is subsequently moved to reverse drive position, the tier will first coast somewhat beyond the precise position it was in when the valve was moved to reverse, and the tier will then rotate in the reverse direction at a substantially reduced rate of speed until the latch finger 138 engages against the next ratchet tooth 132, whereby the hydraulic drive motor 112 will be stalled and the tier will be stopped until the valve is again moved to its forward drive position.

FIGURES 4 and 5 show a normally inoperative microswitch 140 which is mounted to the inner wall of the stationary upper support housing 30 by means of a bracket 142. A radially movable spring plunger 144 is mounted in the wall of the support housing 30 with one end thereof in operative engagement with the microswitch 140 and its other end projecting radially outwardly of the support housing so as to extend into the path of the spring loaded latch finger 138. Accordingly, when the tier 84 is rotated in a forward direction, the microswitch 140 will be actuated whenever the latch assembly 136 on the rotating tier reaches a position in radial alignment with the spring plunger 144 and microswitch 140. It will also be noted that the upper tier 84 is provided with a large recess or opening 146 in the periphery thereof. The opening 146 is large enough to permit a tool to be passed vertically therethrough when such a tool is being transferred to or from one of the lower storage tiers. The purpose of the microswitch 140 is to effect stopping of the tier 84 so as to dispose the opening 146 in a predetermined position to permit such vertical passage of a tool therethrough, as will be described more fully hereinafter.

At the side of the upper support housing 30 opposite the drive motor 112, there is a pad 148 cast on the outer housing wall, and a support bracket 150 is bolted to the pad. A reading head assembly 152 comprising a pair of reader heads 154 and 156 is mounted on the support bracket 150 in a position whereby the lower ends of the code cartridges 94 carried by the upper tier 84 will pass between the two stationary reader heads when the tier is rotated. In other words, the reader heads 154 and 156 are stationary, and as the upper tier 84 rotates, the several cartridges 94 thereon pass between the reader heads so that the latter can read the codes on the cartridges and thereby identify the tool which is in the socket 98 adjacent the cartridge that is passing between the reader heads. Briefly, there is a key 108 corresponding with each tool to be stored in the matrix, and a code is provided through five groups of four lugs representing a five digit decimal number, whereby the removal of certain lugs in a predetermined manner provides a specific binary coded decimal number. When a tool is stored in one of the sockets 98 in the upper tier 84, the corresponding code key is inserted in the associated cartridge 94 and turned so as to raise certain spring contacts to correspond with the key code.

A coicidence logic unit which will be identified later herein is utilized to compare each code sensed by the reader head assembly 152 with a code signal from a control tape, the latter being the code signal identifying the next programmed tool. If it be assumed that the desired tool is in the upper tier 84, then when such tool is in the tool change position indicated at TC in FIGURE 5, the corresponding cartridge 94 will be in between the reader heads 154 and 156, and the coincidence logic unit will determine that the signal from the control tape and the signal from the reader head assembly 152 are identical, whereupon the coincidence logic unit will operate to cause reversal of the valve 122 so as to stop the tier 84 with the desired tool in the tool change position. There has been no attempt to describe the code key 108, reading head assembly 152, code key cartridge 94 or coincidence logic unit in detail herein, since the structure and mode of operation of these several components are fully described in two copending applications of Myron L. Anthony, Serial No. 79,272, filed December 29, 1960, now Patent No. 3,173,203, and Serial No. 100,349, filed April 3, 1961, now Patent No. 3,187,123, both of which are assigned to the assignee of the present invention.

While there has been described in detail hereinabove the upper tier 84 and other components associated with the upper support housing 30, it will be understood that the center tier 84' and the lower tier 84" and the components associated therewith are substantially identical with the structure described in conjunction with the upper tier. Accordingly, corresponding primed numerals are used to identify the center tier 84' and related structural components, and corresponding double primed numerals are used to identify the lower tier 84" and its related components. There are, however, a few differences which should be noted. Thus, the upper tier 84 is provided with the recess 146 in the periphery thereof as above described, and a similar recess 146' is formed in the center tier 84', but no such recess is provided in the lower tier 84" since there is no occasion for passing tools from other tiers through the lowermost tier.

Another possible distinction between the several tiers is that they may be designed to accommodate different numbers of tools. By way of example, in the particular embodiment being described herein in which three tiers are shown, the upper tier 84 is designed to accommodate eleven 8 inch maximum diameter tools, the center tier 84' is designed to accommodate fifteen 6 inch maximum diameter tools, and the lower tier 84" is designed to accommodate twenty-four 4 inch maximum diameter tools, thus providing a total matrix capacity of fifty tools. If, as in this particular embodiment, the tiers are intended to hold different numbers of tools, then the respective index plates will vary accordingly, since the index plates are provided with one ratchet tooth corresponding with each socket (including one tooth corresponding to the openings 146 and 146' in the upper two tiers). Accordingly, the index plate 130 is provided with twelve ratchet teeth, the index plate 130' is provided with sixteen ratchet teeth, and the index plate 130" is provided with twenty-four ratchet teeth. Obviously, the number of cartridges 94 required for a given tier depends upon the number of tool sockets 98 to be provided for such tier. However, except as pointed out above, the three tiers 84, 84' and 84" and the various components associated therewith are substantially identical to what has been described above in connection with the upper tier 84. Thus, each of the three tiers has its own corresponding hydraulic motor and control valve, and each of the three motors is supplied with oil through the passages 50 and 52 in the support housing assembly.

Operation

The operation of the tier type tool storage matrix of the present invention will now be described, and later herein there will be provided a description of the electrical control system for regulating such operation. Referring to FIGURES 3–5, the three tiers 84, 84' and 84" will normally be stopped prior to initiation of a search for the next programmed tool. Thus, the valve 122 for the upper tier 84 will be in its reverse position and the tier will be stopped through engagement of the latch finger 138 against one of the ratchet teeth 132 of the index plate 130, whereby the tier drive motor 112 will be stalled. The other two tiers 84' and 84" will be stopped with their motors stalled in a similar manner. The three microswitches 140, 140' and 140" will be de-energized so that nothing will occur when they are actuated by a corresponding tripping screw carried on one of the latch assemblies 136, 136' or 136". When a signal is received from a control tape to locate a desired tool in the matrix for transfer to the machine tool spindle III, a relay will be actuated which will energize solenoids corresponding with each of the three motor valves 122, 122' and 122" causing each valve to be moved to forward position, Accordingly, each of the tier drive motors 112, 112' and 112" will operate in the forward direction to drive the three tiers 84, 84' and 84" in a forward or clockwise direction as viewed in FIGURE 5.

As the upper tier 84 rotates during the search for a desired tool, the several cartridges 94 mounted on that tier will be passed seriatim through the reader head assembly 152, and the coincidence logic unit (described later herein) corresponding to the upper tier will compare the code on each cartridge with the code signal from the control tape. In a similar fashion, coincidence logic units for the center and lower tiers compare the signals from the cartridges thereon with the signal from the tape. It will of course be assumed that the desired tool is in one of the three tiers, and accordingly when the cartridge 94 corresponding to the desired tool passes through the reader head associated with the tier in which the desired tool is located, the coincidence logic unit for such tier will sense coincidence and energize a relay which will effect the following operations:

Upon coincidence, assuming for example that the desired tool is found in the bottom tier 84", the motor valve 122" corresponding to the tier drive motor 112" will be moved to reverse position. At the moment the valve is reversed, the trailing end of the spring loaded latch finger of the latch assembly 136" will approximately have just dropped behind one ratchet tooth on the index plate 130", and while the tier will coast somewhat after the reversal of the corresponding motor valve, it normally will not coast an amount sufficient to permit the latch to move beyond another ratchet tooth on the index plate. Consequently, the lower tier 84" holding the desired tool will rotate slowly in a reverse or counter-clockwise direction until the latch finger 138" on the tier engages against a tooth on the index plate 130", at which time the tier will stop and the corresponding drive motor 112" will be stalled.

The three reader head assemblies 152, 152' and 152" are in vertical alignment with one another, and their fixed positions are indicated by the showing of the reader head assembly 152 in FIGURE 5. It will thus be seen that when the lower tier 84" is stopped, the desired tool will be in the tool change position indicated at TC. There are of course in effect three tool change positions, depending upon the tool storage tier in which the desired tool is found, but such positions are in vertical alignment and thus are all indicated by the designation TC in FIGURE 5. It will be understood that since the tier 84" will coast somewhat past the desired stop position and then return thereto, the cartridge 94" corresponding with the desired tool will pass through and then beyond the reader head assembly 152". Accordingly, a verification or double check circuit is provided, as will be explained hereinafter, whereby unless the coincidence logic unit again senses coincidence after the tier 84" reverses and the cartridge 94" corresponding with the tool in the tool change position TC again enters the reader head assembly, the search cycle will be initiated all over again. Normally, there will be coincidence and the tier 84" will remain stopped.

When the coincidence logic unit for the lower tier 84" senses that the desired tool has been found and thus actuates an associated relay, another operation which is effected is to supply power to the circuits containing the microswitches for the other two tiers. Thus, in this instance the microswitches 140 and 140' would be rendered operative, since these correspond with the upper and center tiers 84 and 84' which do not contain the desired tool. The microswitch 140 is associated with a relay for changing the position of the solenoid operated hydraulic valve 122 corresponding to the drive motor 112, and when the microswitch 140 is operative, actuation thereof will cause the drive motor 112 to be reversed. Similarly, when the microswitch 140' is operative, actuation thereof will cause the drive motor 112' for the center tier 84' to be reversed.

It will now be understood that since the microswitches 140 and 140' are both rendered operative when the lower tier 84" having the desired tool is reversed and stopped, the upper two tiers will continue to rotate until their microswitches are actuated. In other words, the upper tier 84 will continue to rotate forwardly until it reaches a position where the tripping screw 139 on latch finger 138 engages the spring plunger 144 and actuates the microswitch 140, whereupon a relay is energized to reverse the valve 122 causing the tier 84 to reverse and stop with the latch finger 138 engaged against one of the ratchet teeth 132 on the index plate 130 thereby to stall the motor 112. It will be noted that the latch finger 138 carries the adjustable tripping screw 139 for engaging the spring plunger 144, and that the components are arranged so that the tripping screw will actuate the microswitch when the large opening 146 in the upper tier 84 is vertically aligned with the tool change position TC. Accordingly, the upper tier 84 which in the example being described does not hold the desired tool, will continue to rotate until the opening 146 is aligned with the desired tool in the tool change position TC, and then the tier will be stopped. In the same manner, the switch-actuating means on the center tier 84' actuates the microswitch 140' so as to stop the center tier with its opening 146' in verical alignment with the desired tool in the tool change position. The purpose of such arrangement is that it will permit the desired tool to be removed from its socket 98 and raised vertically by the vertical shuttle IX so as to be passed through the openings in the tiers disposed thereabove. While the lower tier 84" has no such opening therein, it is associated with a microswitch 140" for stopping the tier in a predetermined position when the desired tool is found in one of the other tiers. Actually, it is not critical where the lower tier is stopped if it does not hold the desired tool and thus various other arrangements are possible.

*Vertical Shuttle Mechanism*

Figure 11:
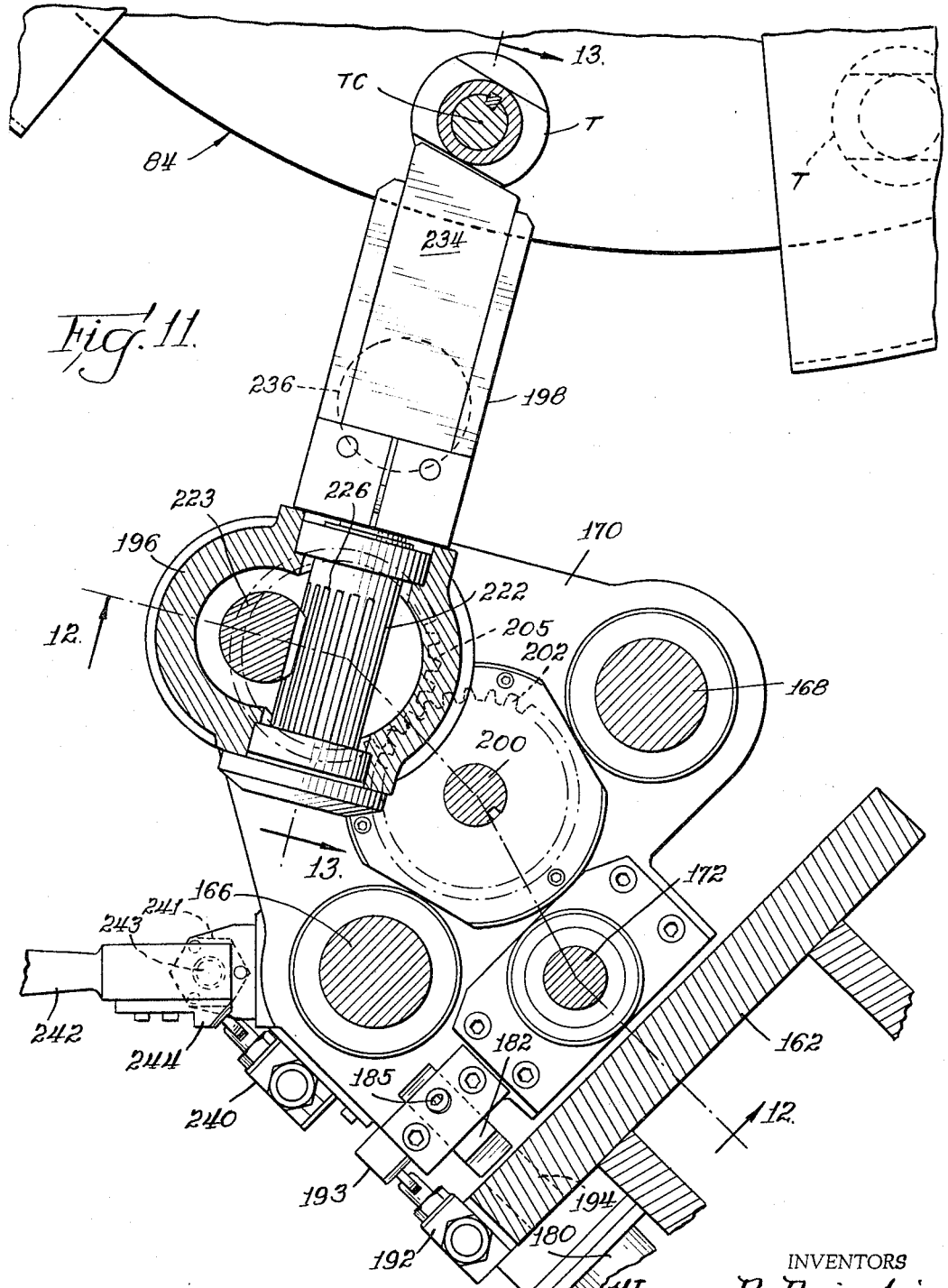
FIGURE 11 is an enlarged horizontal section of the vertical shuttle taken substantially along the line 11—11 of FIGURE 7, the shuttle gripping means being shown in an alternate position.

The vertical shuttle mechanism IX will now be described, and for this purpose reference is first made to FIGURES 7, 8 and 11. FIGURE 7 shows a base plate 160, a stationary upright support gantry 162, and an upper support platform 164. A pair of stationary vertical guide rods 166 and 168 extend between the base 160 and the upper support platform 164, and a shuttle carriage 170 is slidable vertically on the guide rods (see FIGURE 11). A ball screw 172 extends vertically between the base 160 and the upper support platform 164 and passes through the carriage 170 in operative driving relationship therewith, whereby rotation of the ball screw 172 will move the carriage vertically. A hydraulic drive motor 174 for the ball screw 172 is mounted on the upper support platform 164, and the motor 174 is reversible so that the carriage 170 may be moved upwardly and downwardly as desired.

FIGURE 7 further shows a pair of vertically spaced shot pin assemblies 176 and 178 and a pair of corresponding hydraulic cylinders 179 and 180 for actuating the same. The shot pin assemblies and corresponding hydraulic cylinders are mounted on the stationary support frame 162 and are adapted to cooperate with a stop finger 182 which is carried on the carriage 170 for stopping the carriage in an operative vertical position adjacent one of the upper two matrix tiers 84 and 84'. Referring to FIGURE 8, the stop finger 182 is pivotally mounted on the carriage 170 by a pin 183, and pivotal movement of the stop finger is limited by a pair of adjustable set screws 184 and 185. The carriage 170 is normally disposed in its lowermost position as shown in dash lines in FIGURE 8 wherein a stop 186 on the carriage is engaged against a stop 187 on the shuttle base 160.

When the next programmed tool is located in a tool change position in the bottom tool storage tier 84", the carriage 170 need not be moved vertically in order to reach such tool. However, when the desired tool is in the center tier 84' or the upper tier 84, the ball screw drive motor 174 must be operated to raise the carriage 170 to an operative vertical position adjacent the particular tier in which the tool is located. Accordingly, when the coincidence logic unit, to be described later herein, for the center tier 84' senses that the next programmed tool is located in the center tier, the logic unit operates a relay to actuate the hydraulic cylinder 179 which in turn causes a shot pin 188 to be projected into the vertical path of the carriage stop finger 182. Subsequently, after the center tier 84' has been stopped to position the desired tool in the tool change position TC, the drive motor 174 is operated to raise the carriage 170 until the stop finger 182 thereon engages against the projecting shot pin 188, at which time the carriage will be stopped and the hydraulic motor 174 will be stalled.

Figure 8:
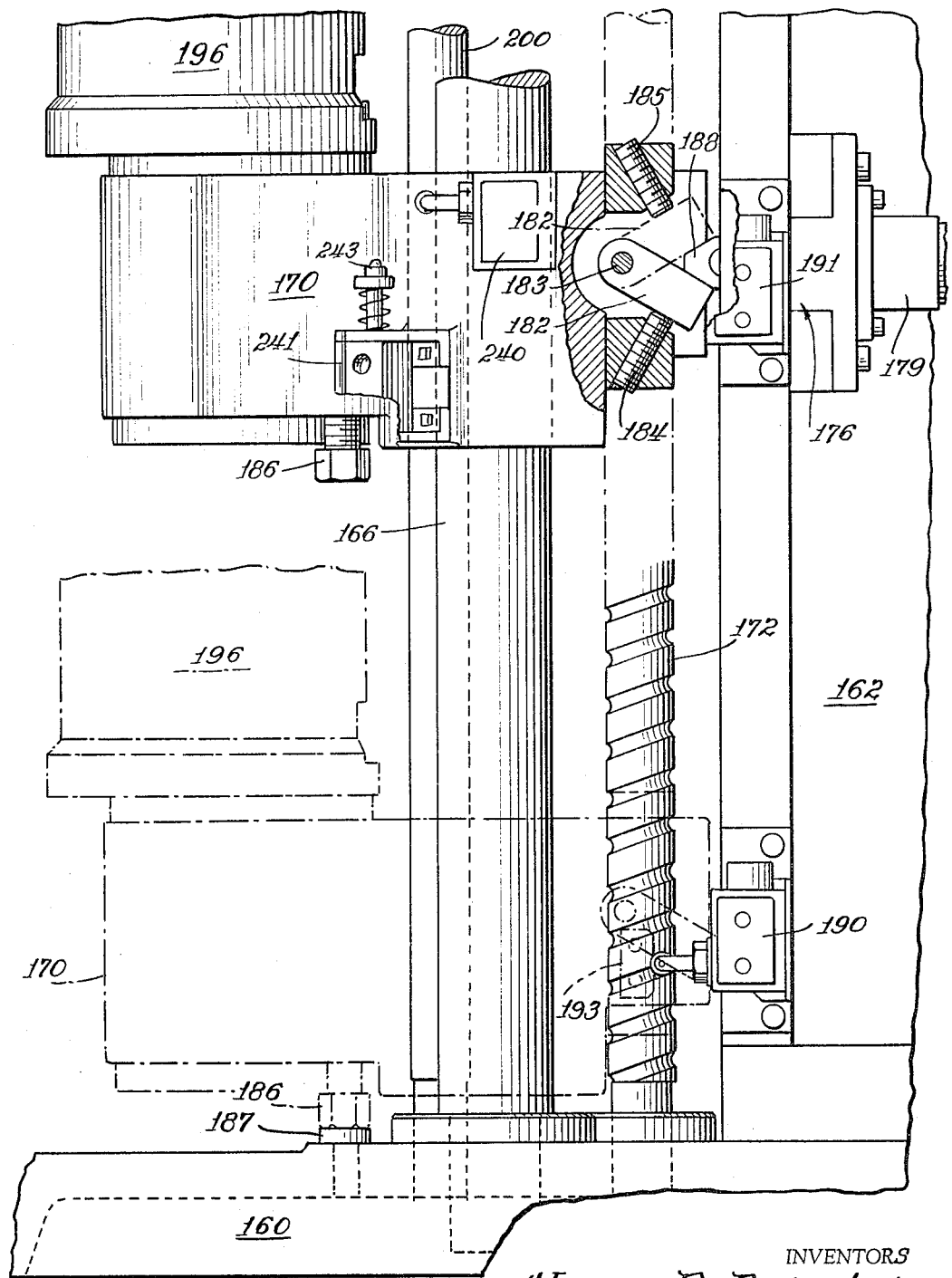
FIGURE 8 is an enlarged fragmentary elevational view of the lower portion of the vertical shuttle of FIGURE 7 illustrating mechanism for controlling the vertical movement and positioning of the shuttle.

It will be noted from FIGURES 7 and 8 that three normally inoperative microswitches 190, 191 and 192 are mounted in vertically spaced relation on the stationary upright support frame 162, and a trip dog 193 is mounted on the carriage 170 for actuating the microswitches. When the carriage 170 is being driven downwardly to its lowermost home position, the trip dog 193 will actuate the microswitch 190, which will first be rendered operative, shortly before the carriage reaches the stop 187, and the switch 190 is adapted to cause the ball screw motor 174 to operate at a substantially reduced rate of speed so that the carriage 170 will move slowly downwardly until the stop 186 engages stop 187. When the carriage 170 is being raised to a position adjacent the center tier 84', the trip dog 193 will actuate the switch 191 (which will be rendered operative when the logic unit for the center tier senses coincidence) before the stop finger 182 engages the shot pin 188, and operation of the switch 191 will cause the motor 174 to operate at a substantially reduced rate of speed so as to drive the carriage upwardly at such reduced rate of speed until the finger 182 engages the shot pin 188 so as to stop the carriage and stall the drive motor. It will further be understood that when the coincidence logic unit for the top matrix tier 84 senses that the next programmed tool is located in such tier, the logic unit will operate a relay which will operate the hydraulic cylinder 180 so as to cause a shot pin 194 to be projected (see FIGURE 7), and thus the carriage 170 will be moved upwardly to an operative position adjacent the upper tool storage tier. Similarly, when the carriage 170 is at the uppermost portion of the shuttle and is to be brought downwardly to return a tool to an empty socket 98 in one of the matrix tiers, the shot pins 188 and 194 serve to stop the carriage in the proper vertical position if the tool is to be returned to one of the upper two tiers.

Still referring to FIGURE 7, the carriage 170 has a housing 196 mounted thereon, and the housing 196 has tool gripper means 198 mounted thereon. The housing 196 is rotatable about a vertical axis relative to the carriage 170, and the gripper means 198 on the housing is rotatable about a horizontal axis relative to the housing. As will be explained more fully later herein, the housing 196 rotates about a vertical axis to swing the gripper 198 between a first pivotal position (as shown in dash lines in FIGURE 2) wherein it is adapted to grip a tool disposed in a tool change position in one of the storage tiers, and a second pivotal position (as shown in solid lines in FIGURE 2) wherein it is disposed away from the tool storage tiers. In addition, the gripper means 198 is rotatable about a horizontal axis relative to the housing 196 so that it is adapted to grip a tool which is vertically disposed in one of the matrix tiers and, after removing the tool from its socket 98 to position the tool horizontally for transfer to the horizontal shuttle IV.

A rotatably mounted shaft 200 (see FIGURE 7) extends vertically between the shuttle base 160 and the upper support platform 164. The rotation shaft 200 extends through the carriage 170 in operative driving relationship therewith, and the carriage is vertically movable relative to the shaft. As is best shown in FIGURE 12, the rotation shaft 200 is keyed to a sleeve 201 which has a gear 202 fixedly mounted thereon, whereby rotation of the shaft 200 will effect rotation of the gear 202. However, it will be understood that a splined connection or any other suitable slidable connection may be used other than a key to provide a drive between the shaft 200 and the gear 202. In other words, the sleeve 201 and gear 202 are mounted on the carriage 170 for vertical movement therewith relative to shaft 200, but rotation of the shaft 200 will effect rotation of gear 202 regardless of the vertical position of the carriage. The rotatable housing 196 has a sleeve 203 secured thereto by a plurality of bolts 204, and a gear 205 is fixedly mounted on the sleeve 203 and is positioned so as to mesh with the gear 202. Consequently, rotation of the shaft 200 and gear 202 will effect rotation of gear 205, sleeve 203 and housing 196.

In the particular embodiment being described herein, the shaft 200 is rotated an amount sufficient to rotate the housing 196 about a vertical axis through an angle of 105 degrees. The mechanism for rotating the shaft 200 is best shown in FIGURES 9 and 10 and comprises a hydraulic cylinder 206, a piston 207 having rack teeth 208 formed thereon, and a pinion 209 which is secured to the upper end of the shaft 200. The cylinder 206 and piston 207 are mounted on the top of the upper support platform 164, and as mentioned above the stroke of the rack 207 is selected to provide a 105 degree rotation of housing 196. Accordingly, it will be understood that operation of the cylinder 206 to move the rack 207 in a given direction will rotate the housing 196 relative to the carriage 170 through an angle of 105 degrees, and the cylinder 206 being double acting will thus permit rotation of housing 196 in either direction about a vertical axis.

In a compartment 210 (see FIGURE 10) immediately above the rack member 207 there are mounted a pair of switches 211 and 212, and the rack is provided with a raised portion 213 on its upper surface for actuating such switches. Thus, the switch 211 will be actuated when the rack 207 is fully extended to indicate that the housing 196 has been rotated 105 degrees to swing the gripper means 198 to its inner pivotal position (as shown in dash lines in FIGURE 2), and the switch 212 is actuated when the rack 207 is in its retracted position to indicate that the housing 196 has been rotated 105 degrees in the opposite direction to swing the gripping means away from the tool storage matrix (as shown in solid lines in FIGURE 2).

Referring again to FIGURE 12, the vertically movable carriage 170 has a cam support shaft 216 fixedly secured thereto, and a cam 217 is fixedly mounted on the upper end of the shaft 216 by means of a key 218, retainer plate 219 and bolt 220. Consequently, once the carriage 170 has been stopped in a given vertical position, the carriage 170, cam support shaft 216 and cam 217 will be stationary, and upon rotation of the shaft 200 the housing 196 will be rotated relative to the foregoing stationary components. Supported on the rotatable housing 196 is a horizontal shaft 222 which supports the gripping means 198, and the shaft 22 is mounted on the housing for rotation about its own horizontal axis. Also supported on housing 196 for rotation therewith about a vertical axis are a vertically movable rack member 223, and a cam follower 224 which is fixedly secured to the lower end of the rack member. The rack 223 is provided with rack teeth 225 which mesh with teeth 226 formed on the horizontal shaft 222, whereby vertical movement of the rack 223 will effect rotation of shaft 222 about its horizontal axis. It will further be noted that the cam follower 224 is disposed in an inclined cam track 228 (see FIGURES 12, 13 and 14), whereby when the follower 224 rotates with the housing 196, the follower will ride up the stationary cam track 228 so as to produce vertical movement of the rack 223 and thereby effect rotation of the horizontal shaft 222.

It will be understood from the foregoing that whenever the housing 196 is rotated about a vertical axis relative to the carriage 170, the shaft 222 which carries the gripping means 198 will automatically be rotated simultaneously about a horizontal axis. In the embodiment being described, that rotation of the housing 196 is through an angle of 105 degrees, whereas the rotation of the shaft 222 and gripping means 198 is through an angle of 90 degrees. In addition, the cam track 228 is provided with a dwell portion 228' (see FIGURE 14) at one end thereof, and the cam is designed so that when the gripping means 198 is being rotated about a vertical axis with the housing 196 so as to move toward a tool in the storage matrix, the 90 degree rotation of the gripping means 198 about a horizontal axis will be completed after the first 90 degrees of rotation of the housing 196, whereby during the last 15 degrees of rotation of housing 196, the horizontal shaft 222 will not rotate about its horizontal axis. The purpose of the foregoing arrangement, which will become more clear hereinafter, is to assure that the gripping means 198 is properly oriented to grip a tool before it actually reaches the tool.

FIGURE 13 shows the gripping means 198 which comprises a pair of gripper jaws 232 and 234 which are adapted to grip a flange T' which projects radially outwardly from the body of the tool holder T. The jaw 234 is movable to effect gripping and release of the flange T', and actuating means for moving the jaw 234 between open and closed positions is indicated generally at 236 and is described in greater detail in the above-mentioned copending application Serial No. 274,414. The tool holder T is shown disposed vertically in FIGURE 13, and as previously described the tools T are vertically disposed when stored in one of the matrix tiers 84, 84' or 84". Accordingly, the jaws 232 and 234 must be horizontally disposed (as shown in FIGURE 13) in order to grip the flange on a tool which is stored in the matrix. On the other hand such a tool must be held in a horizontal position when it is to be transferred to the exchanger VI on the horizontal shuttle IV, in which case the gripper jaws 232 and 234 must be vertically disposed. The previously described mechanism of FIGURES 12 and 13 for rotating the shuttle housing 196 about a vertical axis and for rotating the gripper means 198 thereon about a horizontal axis is coordinated so that when the housing 196 is rotated to swing the gripping means in toward the matrix, the gripper jaws 232 and 234 will be rotated to a horizontal position as shown in FIGURE 13, and when the housing is rotated to swing the gripper means away from the matrix, the gripper jaws will be vertically disposed as shown in solid lines in FIGURES 2 and 7.

As was mentioned earlier herein the vertical shuttle IX is adapted to remove a tool T from the storage matrix VIII and to transfer the tool to the exchanger VI on the horizontal shuttle IV, and the horizontal shuttle IV is mounted on the head II of the machine tool I for vertical movement therewith. Consequently, the transfer of a tool from the vertical shuttle IX to the horizontal shuttle IV will take place at varying vertical positions depending upon the vertical position of the horizontal shuttle IV. Referring to FIGURES 7 and 11, a microswitch 240 and a servo valve 241 are mounted on the vertically movable shuttle carriage 170, and an arm 242 is provided on the machine tool head II and carries on its end an actuating member 244 which is disposed in the vertical path of the switch 240 and also in the vertical path of a valve plunger 243 which is associated with the servo valve 241 and which is spring loaded upwardly. The switch 240 and servo valve 241 are arranged so that when the carriage 170 is moving upwardly with a new tool held in the gripper means 198 for transfer to the horizontal shuttle IV, the switch 240 will be actuated first by the member 244, and thereafter the plunger 243 will engage the underside of the member 244 and be urged downwardly thereby. The switch 240 is associated with the shuttle drive motor 174 so that upon actuation of the switch the drive motor is operated at a substantially reduced rate of speed. In addition, the servo valve 241 is associated with the hydraulic power supply to the shuttle motor 174 for controlling the operation of the latter. Thus, when the plunger 243 is in its uppermost position to which it is biased, the motor 174 will drive the carriage 170 upwardly, and when the plunger 243 is moved to its lowermost position, the carriage 170 will be driven downwardly. When the plunger 243 is moved to an intermediate vertical position, the servo valve will shut off the supply of hydraulic fluid to the motor 174, and thus the foregoing constitutes a neutral position.

It will now be understood that as the carriage 170 is driven upwardly and approaches an operative position relative to the horizontal shuttle IV, the switch 240 will be actuated by the actuator 244, and thereafter the carriage will creep upwardly at a reduced rate of speed until the plunger 243 engages the underside of actuator 244, whereupon the plunger will be moved to its intermediate neutral position and the carriage 170 will be stopped. Thereafter, if the machine tool head II should move vertically so as to cause the horizontal shuttle IV and the arm 242 to move vertically, the shuttle carriage 170 will follow so as to maintain an operative tool transfer position relative to the horizontal shuttle, regardless of whether the latter moves upwardly or downwardly. That is, if the arm 242 on the head moves upwardly, the upwardly biased spring loaded plunger 243 will move to its uppermost position and cause the carriage 170 to be driven upwardly until the plunger is again moved to its intermediate neutral position through engagement with the underside of the actuator 244. Furthermore, if the head II should move downwardly, the arm 242 will force the plunger 243 downwardly to its lowermost position so as to cause the carriage 170 to be driven downwardly, and when the arm 242 stops, the carriage will be driven further downwardly only far enough to permit the upwardly biased plunger 243 to return to neutral position, whereupon the carriage will stop. It will further be understood that a solenoid may be mounted on the underside of the servo valve 241 and arranged upon actuation to pull the plunger 243 downwardly, thereby to provide control of the drive motor 174 independently of the actuator 244.

*Operation*

When the three matrix tiers 84, 84' and 84" are rotating to search for the next programmed tool, the shuttle carriage 170 will be in its lowermost position as shown in dash lines in FIGURE 8. If the programmed tool is located in the bottom tier 84", the shuttle carriage will already be at a proper vertical position for the gripper means 198 to swing in and grip the desired tool. However, it will here be assumed that the coincidence logic unit associated with the center tier 84' senses coincidence and initiates certain operations (described elsewhere herein) to stop the center tier 84' with the desired tool in a predetermined tool change position and to stop the other two tiers, the upper tier 84 being stopped with its opening 146 in vertical alignment with the tool change position.

When the coincidence logic unit for the center tier 84' senses coincidence, it operates a relay which causes the hydraulic cylinder 179 to actuate the shuttle shot pin 188 to its projected position (as best shown in FIGURE 8), and to render the shuttle microswitch 191 operative.

After the matrix tiers are all stopped in the proper positions, a signal is sent to the shuttle motor 174 (see FIGURE 7) which rotates the ball screw 172 so as to raise the shuttle carriage 170. The carriage 170 moves upwardly on the guide rods 166 and 168 until the trip dog 193 engages the operative microswitch 191, thereby causing the motor 174 to move the carriage upwardly at a substantially reduced rate of speed. The carriage 170 thus creeps upwardly until the stop finger 182 thereon engages the projected shot pin 188, at which time the carriage is stopped in an operative vertical position adjacent the center matrix tier 84', and the shuttle drive motor 174 is stalled.

With the carriage 170 properly positioned vertically, a signal is sent to the hydraulic cylinder 206 (see FIGURES 7, 9 and 10) which actuates the rack member 207 so as to rotate the pinion 209 and shaft 200. The foregoing signal may be initiated by the shuttle microswitch 191, assuming a time delay is provided to assure that the carriage 170 has stopped. The rotation of shaft 200 acting through the gear drive of FIGURE 12 effects rotation about a vertical axis of the shuttle housing 196 which carries the gripper means 198. In addition, the cam 217 and related mechanism of FIGURES 12 and 13 operates in response to rotation of the housing 196 to actuate the rack member 223 and thereby rotate the shaft 222 and gripping means 198 about a horizontal axis. The rotation of the housing 196 about a vertical axis is through an angle of 105 degrees, and the rotation of the gripping means 198 about a horizontal axis is through an angle of 90 degrees.

Figure 2:
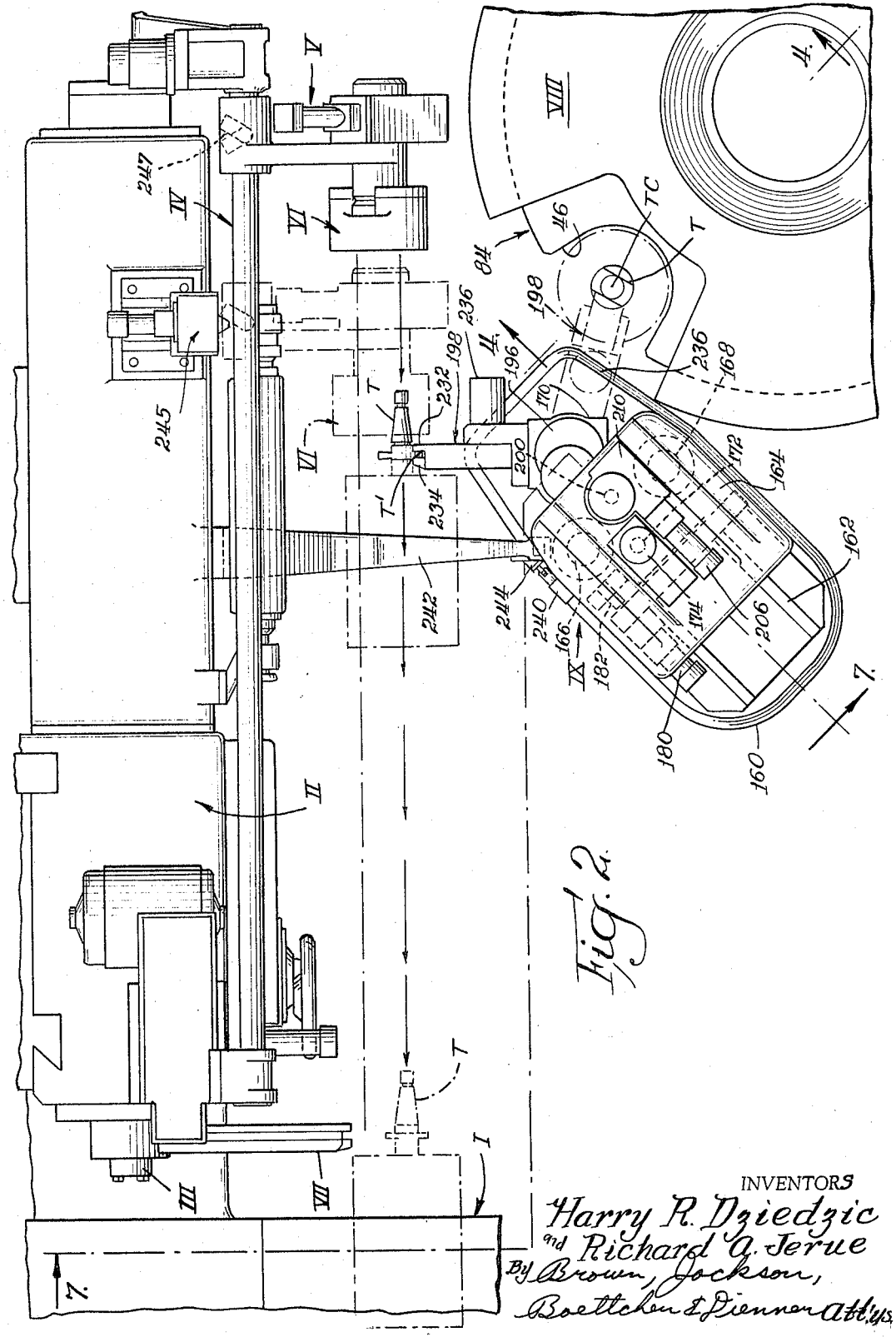
FIGURE 2 is an enlarged fragmentary top plan view looking substantially in the direction of the arrows 2—2 of FIGURE 1.

With reference to FIGURE 2, the gripper means 198 is initially in the pivotal position shown in solid lines so as to be swung away from the matrix VIII with the gripper jaws 232 and 234 open and disposed vertically. When the hydraulic cylinder 206 is actuated in the manner described above, the gripper means 198 is swung about a vertical axis through 105 degrees to the position shown in dash lines in FIGURE 2, and during the first 90 degrees of such rotation the gripper jaws 232 and 234 are rotated 90 degrees about a horizontal axis to a horizontal position whereby the jaws will encompass a flange T' (see FIGURE 13) on the vertically disposed tool in a tool change position in the center matrix tier 84'. The actuating mechanism 236 (see FIGURE 13) is then operated in response to actuation of the switch 211 (see FIGURE 10) to close the jaws, and the cylinder 179 is operated to retract the shot pin 188, whereupon the shuttle motor 174 operates to move the carriage 170 upwardly so as to raise the selected tool directly upwardly out of its socket 98. The carriage 170 continues to move upwardly until the servo valve plunger 243 on the carriage engages the actuator 244 on the arm 242 which extends from the machine tool head II. Movement of the plunger 243 downwardly to an intermediate vertical position causes the motor 174 to be placed in neutral drive position, whereby the carriage 170 is stopped in an operative vertical position relative to the exchanger VI on the horizontal shuttle IV (see FIGURES 2 and 7).

Once the carriage 170 has been raised to the proper vertical position in accordance with the height of the machine tool head II, the hydraulic cylinder 206 is operated in response to actuation of the switch 240 to swing the gripping means 198 about a vertical axis from the position shown in dash lines in FIGURE 2 to the position shown in solid lines therein, and during such rotation the gripper jaws 232 and 234 are rotated 90 degrees about a horizontal axis from a horizontal position to a vertical position so as to dispose the selected tool in a horizontal position in front of the exchanger VI (as shown in solid lines in FIGURE 2). Once a machining operation at the spindle III has been completed, the exchanger VI is moved forwardly to receive and grip the tool, the jaws 232 and 234 are opened, the shuttle is moved downwardly out of the path of the exchanger, and the horizontal shuttle IV is operated to move the selected tool forwardly for transfer to the tool change arm VII. FIGURE 2 shows a shot pin assembly 245 which is mounted on the structure of the horizontal shuttle IV and cooperates with a stop finger 247 on the horizontal shuttle carriage V for stopping the exchanger VI in a proper position to receive and grip a tool being held for transfer thereto by the gripping means 198. The shot pin assembly 245 may operate as described earlier herein with respect to the shot pin assemblies 176 and 178 associated with the vertical shuttle.

The exchanger VI will subsequently return with a tool which has been removed from the spindle III and will position such tool as shown in solid lines in FIGURE 2. The shuttle will then move upwardly to cause the gripper jaws 232 and 234 to encompass the flange T' on the tool, and the jaws will close. Then, in a manner which will be obvious from the foregoing description, the exchanger VI moves rearwardly to clear the tool, and the shuttle housing 196 is rotated 105 degrees about a vertical axis thus effecting a 90 degree rotation of the gripping means 198 about a horizontal axis, whereby the tool is vertically disposed in alignment with the tool change position TC as shown in dash lines in FIGURE 2, and the microswitch 211 (see FIGURE 10) will be operated. When the matrix tiers 84, 84' and 84" have been positioned to align the proper socket with the tool and provide a clear vertical path thereto, the shuttle carriage 170 is moved downwardly so as to transfer the tool into the proper socket 98. After the tool is inserted in its socket 98, the gripper means 198 is released and swung away from the matrix and the empty jaws rotated to vertical positions, as shown in solid lines in FIGURE 2. Then, unless the tool was returned to the lower tier 84", the carriage 170 will be moved vertically in response to operation of microswitch 212 so as to return to its lowermost position as shown in dash lines in FIGURE 8.

*Electrical control system for matrix and shuttle*

Figure 15A:
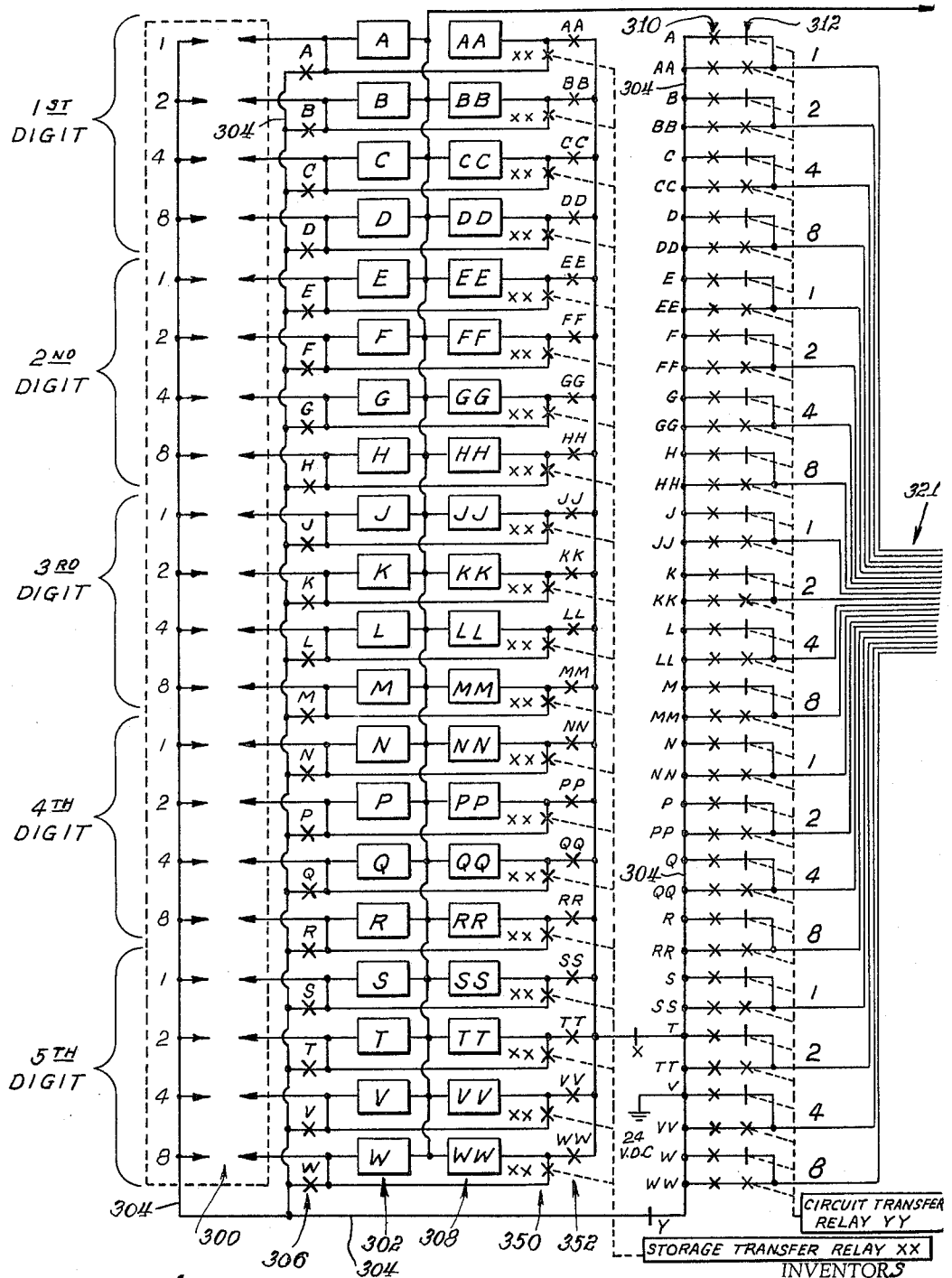

Reference is now made to FIGURES 15a and 15b which taken together comprise a schematic wiring diagram illustrating the nature of the electrical controls which may be used to regulate the automatic tool changing apparatus of the present invention. There is shown a vertical row 300 of twenty normally open contacts which in effect comprise five groups of four contacts each, with each group representing a particular digit of a five digit code number. These contacts, which will be referred to collectively as the contacts 300, represent binary coded decimal tool numbers, and the four contacts in each group which are used to designate a given digit are numbered 1, 2, 4 and 8. These contacts 300 are closed by signals from the control tape, which signals indicate the code of the next programmed tool which is to be transferred from the matrix VIII to the machine tool spindle III. Thus, if the code number of the desired tool is 34567, the contacts 1 and 2 of the group representing the first digit will be closed, the contact 4 of the group representing the second digit will be closed, the contacts 1 and 4 of the group representing the third digit will be closed, the contacts 2 and 4 of the group representing the fourth digit will be closed, and the contacts 1, 2 and 4 of the group representing the fifth digit will be closed. In this manner, signals from the control tape close certain ones of the twenty contacts 300, whereby the closed contacts represent the binary coded decimal tool number of the next programmed tool which is to be transferred to the machine tool spindle III.

FIGURE 15a shows a vertical row 302 of twenty relays A, B, C . . . W which comprise first storage means for the control system, and these relays 302 are connected to a ground line of the circuit indicated at 304 by corresponding normally open contacts indicated generally in a vertical row at 306 and designated A, B, C . . . W. By way of example, assuming that the control tape signals for a tool having the code 10,000, the only contact 300 which will be closed is the contact 1 of the group representing the first digit, while the other nineteen of the contacts 300 will remain open. When such contact is closed, the ground line 304 is connected to relay A of the relays 302 (which may be referred to as relay 302A) which in turn closes normally open contact A of the contacts 306 (which may be referred to as contact 306A). The closing of normally open contact 306A provides a connection between the group line 304 and the relay 302A independently of the contact 1 of the control contacts 300, and thus the relay 302A will remain energized after the contact 1 of the contacts 300 is again opened.

It will be understood from the foregoing that in the present example, when the control tape signals for the tool having code number 10,000, the relay 302A will be energized, and any normally open A contacts in the system will be closed and any normally closed A contacts will be opened. A second storage means comprises a vertical row 308 of twenty relays AA, BB, CC . . . WW which are adapted to be connected with the relays 302A, 302B, 302C . . . 302W, respectively. The function of the second means 308 will be described later herein.

FIGURE 15a further shows a vertical row 310 of contacts, and another row of contacts in series therewith indicated generally at 312. There are forty contacts in the row 310, all of which are normally open, and there are forty contacts in the row 312, twenty of which are normally open and twenty of which are normally closed. The above-described forty contacts 312 are actually twenty "Type C" contacts, each of which comprises a normally open side and a normally closed side, and all of the contacts 312 are operated simultaneously by a circuit transfer relay YY. It will be understood that when the relay 302A is energized, as above described, it will close the normally open contact 310A, whereby a circuit will be completed from ground line 304 through the normally open contact 310A and the normally closed contact 312 in series therewith to three coincidence logic units 316, 318 and 320, the latter being shown in FIGURE 15b.

Leads to the three coincidence logic units are indicated collectively at 322, 324 and 326, and it will be seen that the three units are connected in parallel and are fed from twenty leads indicated collectively at 321. It is important to understand that each of the coincidence logic units 316, 318 and 320 has twenty inputs, in accordance with the binary coded decimal tool numbers described earlier, and thus since in the present example only the contact 310A of the contacts 310 has been closed, current will be supplied in parallel only to the first input of each of three coincidence logic units. Accordingly, each of the three logic units will be adapted to search for a new tool having the code 10,000.

Three coincidence logic units are shown in FIGURE 15b because in the embodiment of the matrix VIII which is described herein there are three tiers 84, 84' and 84"; and three corresponding reader heads 152, 152' and 152". Consequently, the coincidence logic unit 316 is associated with the upper tier 84 and is provided with twenty input leads from the reader head 152 indicated schematically by the lead 323 so as to permit the unit to sense the code signals from the the reader head. In a similar manner, the coincidence logic unit 318 is associated with the center tier 84' and is provided with twenty input leads indicated schematically by the lead 325 so as to permit the unit to sense the code signals from the reader head 152'. Further, the coincidence logic unit 320 is associated with the lower tier 84" and is provided with twenty input leads indicated schematically by the lead 327 so as to permit the unit to sense the code signals from the reader head 152".

The logic unit 316 has an associated normally open contact 330 which is closed so as to cause energization of a relay AB when the logic unit senses coincidence, that is, when the unit determines that the code signal from the control tape through the inputs 322 is the same as the code signal from the reader head 152 through the inputs 323. Such coincidence will occur when the next programmed tool to be transferred from the matrix VIII is located in the top tier 84 and is disposed in the tool change position TC as shown in FIGURE 4. In a similar manner, a normally open contact 332 is associated with the logic unit 318 so as to close and energize a relay AC when such unit senses coincidence, and a contact 334 is associated with the logic unit 320 so as to close and energize a relay AD when such unit senses coincidence. It will be understood that during a search for a new tool in the matrix VIII, only one of the three logic units will reach coincidence, since only one of the three matrix tiers will contain the desired tool.

FIGURE 15b further shows a plurality of contacts designated AB, AC or AD, and it will be understood that such contacts are operated upon energization of the corresponding one of the relays AB, AC or AD when the next programmed tool to be transferred is found in one of the three matrix tiers 84, 84' and 84". The control system includes six relays S1, S2, S3, S4, S5 and S6 which control the tier drive motors 112, 112' and 112" for stopping the tiers after the desired tool has been found. In other words, the drive motor 112 for the top tier 84 has an associated valve 122 which as earlier described is always open on one side and is thus either in the forward position or the reverse position. The valve 122 may be solenoid operated, and the relay S1 which is the top tier stop relay is associated with the solenoid for the valve 122 whereby upon energization of relay S1 the valve will be moved to reverse position and the top tier 84 caused to stop. In a similar manner, energization of relay S2 will cause the center tier 84' to stop, and energization of relay S3 will cause the lower tier 84" to stop. In addition, the relays S4, S5 and S6 are associated respectively with the same valve solenoids so as to be adapted to move the valves to reverse position. Thus, relay S4 which may be termed the top tier home relay will when energized cause the top tier 84 to stop, and similarly, energization of relay S5 will stop the center tier 84', and energization of relay S6 will stop the lower tier 84".

The normally open microswitch 140 associated with the upper tier 84 is in the circuit of relay S4, and thus the relay S4 cannot be energized until microswitch 140 is actuated by the tripping screw 139 (carried on the latch mechanism 136 of the top tier 84) in the manner previously described. Also, in a similar manner, the normally open microswitch 140' for the center tier 84' is in the circuit of relay S5, and the normally open microswitch 140" for the lower tier 84" is in the circuit of relay S6. It will further be noted that normally open contacts AB, AC and AD are in the circuits of microswitches 140, 140' and 140", so that all three microswitches will be dead until such time as a desired tool is found in one of the matrix tiers and one of the relays AB, AC or AD is thus energized.

A supply line 340 shown in FIGURE 15b extends to components designated as "new tool readout wiring" and "old tool readout wiring" which are shown schematically at 342 and 344. The member 342 includes five sections (not shown) each containing ten light bulbs and associated circuitry including a plurality of contacts operated by the relays 302 whereby, depending upon which of the relays 302 is energized, certain corresponding ones of the light bulbs will be energized to indicate the code number of the new tool which will be transferred from the matrix. Such a system permits an operator to check visually to assure that the tool which is being transferred is in fact the tool which the prearranged program calls for. Similarly, the second storage means or relays 308 control the visual readout member 344 for the old tool and, as will become more clear hereinafter, the latter readout member permits an operator to check visually to assure that an old tool which has been removed from the spindle III is being returned to the proper empty socket 98 in the matrix VIII. In effect, the members 342 and 344 provide visual indication of the respective code numbers stored in the first and second storage means 302 and 308.

The supply line 340 also leads to a plurality of contacts 346 indicated as YY, A, B, C, . . . W, and then to a Z relay which has a time delay of one second. The several contacts 346 are all normally open and are connected in parallel, and thus the closing of any one of the contacts 346 will, after the one second time delay, effect operation of relay Z. The contacts 346A, 346B, etc., are closed upon energization of a corresponding one of the relays 302A, 302B, etc. Accordingly, it will be understood that when the control tape closes certain ones of the contacts 300 and thereby energizes corresponding ones of the relays 302, the relay Z will also be energized. The one second time delay for the relay Z is to assure that it will not be operated until all of the relays 302 which should be energized in accordance with the code number of the new tool are in fact energized so that the logic units 316, 318 and 320 will each have received the code signals indicating the tool to be searched for in the matrix. Then, relay Z is operated, and such relay is associated with the three valves 122, 122' and 122" for the tier drive motors 112, 112' and 112", so as to move such valves to forward positions. Thus, when relay Z is operated, the three tiers 84, 84' and 84" are all rotated in the forward direction to search for the desired tool.

A further portion of the control system comprises a double check circuit (see upper right hand portion of FIGURE 15b) which provides for verification that the proper tool in the matrix VIII has been stopped in the tool change position TC. The operation of such circuit will be explained more fully hereinafter, but it will here be noted that the supply line 340 extends to four normally open contacts $BA_1$, AB, AC and AD, connected in parallel, and then to relays BD, BA and BC. Also in the circuit are normally closed contacts BC, BD and $BA_2$. It is important to note that while normally open contact $BA_1$ and normally closed contact $BA_2$ are both operated upon energization of relay BA, such contacts are associated in such a manner that when operated the normally open contact $BA_1$ will always close before the normally closed contact $BA_2$ opens.

In the system described herein it will be understood that when a tool is returned to the matrix VIII it must be returned to the same matrix socket 98 from which it was taken. That is, the tool is identified by a corresponding code cartridge 94 adjacent to the matrix socket 98 in which the tool is stored, and accordingly each tool must always be returned to the socket in which it was originally stored. In order that the foregoing may be accomplished, the second storage relays 308 are provided to store the code number of a tool which has been removed from the matrix VIII and transferred to the machine tool spindle III. Then, when such tool is to be returned to the matrix, a search is conducted for the empty socket 98 in the matrix from which the tool was taken. Such a search is substantially the same as the previously described search for a new tool, except that it is the second storage means or relays 308 rather than the first storage means or relays 302 which are connected to supply information to the coincidence logic units 316, 318 and 320.

Referring to FIGURE 15a, there is provided a circuit transfer relay YY which simultaneously operates the forty contacts 312, twenty of which are normally open and twenty of which are normally closed. In the normal positions of contacts 312, it is the relays 302 which control transmission of code signals to the three coincidence logic units through the leads 321 and the logic unit parallel input leads 322, 324 and 326. However, when the relay YY is energized so as to alternate the positions of the forty contacts 312, it is then the relays 308 which control transmission of code signals to the logic units. For example, assuming relay YY is deenergized, then as previously described the energization of relay 302A will close normally open contact 310A and complete a circuit from the ground line 304 through contact 310A and the normally closed contact 312 in series therewith to transmit a signal to the three logic units. However, when relay YY is energized, the above-mentioned contact 312 in series with contact 310A will be open to prevent such a circuit. In the latter situation, it will be seen that energization of relay 308AA will close normally open contact 310AA, and since relay YY is energized, the normally open contact 312 in series with contact 310AA will be closed so that a circuit will be completed from ground line 304 to the three coincidence logic units. Summarizing the foregoing, when the circuit transfer relay YY is deenergized, the first storage relays 302 supply information to the three coincidence logic units, and when the relay YY is energized, the second storage relays 308 supply information to the three logic units.

Still referring to the control circuit illustrated in FIGURE 15a, there is shown a vertical row of normally open contacts 350 each designated XX to indicate that all twenty of the contacts 350 are closed simultaneously upon energization of a storage transfer relay XX. Adjacent the contacts 350, there is provided a vertical row of normally open contacts 352 designated AA, BB, CC ... WW, which contacts are closed upon energization of the corresponding ones of the relays 308. In order to transfer information from the first storage relays 302 to the second storage relays 308, the relay XX is energized. For example, assuming that relay 302A in the first storage means is energized, then by energizing relay XX and thereby closing all of the contacts 350, the left side of relay 302A is connected to the right side of relay 308AA so as to energize the latter. Thus, when certain ones of the relays 302 of the first storage means are energized, then upon energizing storage transfer relay XX, the corresponding ones of the relays 308 in the second storage means will be energized. When for example relay 308AA is thus energized, it will close normally open contact 352AA so as to independently connect the relay 308AA to the ground line 304 through a normally closed contact X (shown adjacent the contact 352TT), whereby the relay 308AA will remain energized after being disconnected from the first storage means 302. It will also be understood that all of the relays 308 of the second storage means can be deenergized by opening the abovementioned normally closed contact X. In addition, it will be seen that there is a normally closed contact Y in the ground line 304 (at the extreme lower end of the drawing) which when opened will cause all of the relays 302 in the first storage means to be deenergized.

With respect to the sequence of operations of the foregoing components, once a tool has been removed from the spindle III and returned to its proper socket 98 in the matrix, first the contact X is opened to deenergize all of the relays 308 and in effect dump the second storage means, the relay XX is then energized to transfer the information in the first storage means 302 to the second storage means 308, the contact Y is then opened to deenergize all of the relays 302 and in effect dump the first storage means, and then the relay YY is deenergized so that the first storage relays 302 will again be adapted to supply information to the three coincidence logic units 316, 318 and 320. The foregoing four operations can be initiated by adapting the gripping means 198 of the vertical shuttle to IX to engage four switches in sequence when it is pivoted outwardly after returning a tool to the matrix. However, it will be understood that such operations can also be performed by providing one switch (actuated by the shuttle) in combination with four relays connected in parallel and each having a different time delay in order to effect the necessary operations in sequence.

Operation

Having in mind the foregoing description, the operation of the control system will now be described, and by way of example it will be assumed that the control tape has signalled for a new tool having the code number 10,000, and thus only the uppermost one of the twenty contacts 300 is closed. Upon closing of the uppermost contact 300, the relay 302A is energized so as to close normally open contact 310A and cause a signal to be transmitted over leads 321, 322, 324 and 326 to the three coincidence logic units 316, 318 and 320. Thus, each of the three logic units corresponding with the three matrix tiers 84, 84' and 84" will be conditioned to search for the tool represented by code number 10,000.

When the relay 302A is energized, the normally open contact 346A (see FIGURE 15b) will be closed so as to complete a circuit to the relay Z, which has a one second time delay. Thus, after one second, relay Z will operate, and as previously described the relay Z will cause the three valves 122, 122' and 122" associated with the three tier drive motors 112, 112' and 112" to be moved to forward positions, whereby the three tiers 84, 84' and 84" will all be rotated in the forward direction to search for the programmed tool. Assuming that the desired tool is located in the upper tier 84, then when the code cartridge 94 which has been set to designate code number 10,000 passes through the reader head 152 associated with the upper tier, the corresponding coincidence logic unit 316 will sense coincidence and the contact 330 will close causing the relay AB to be energized.

When the relay AB associated with logic units 316 is energized, any normally open contacts AB in the system are closed, and any normally closed AB contacts are opened. In particular, with reference to the double check portion of the circuit (see upper right hand corner of FIGURE 15b), the normally open contact AB is closed so as to complete a circuit from the supply line 340 to all three of the relays BD, BA and BC. It will be noted that the circuit to relay BD includes normally closed contacts $BA_2$ and BC, and the circuit to relay BA includes normally closed contacts $BA_2$ and BD. It is important to note that relay BD has a five second time delay, relay BA is of a type which operates substantially without delay, and relay BC has a two second time delay. Accordingly, relay BA is operated immediately so as to close the normally open contact BA in the circuit to the relays S1, S2, S3, S4, S5 and S6. Thus, since relays AB and BA are both operated, a circuit will be completed from the supply line 340 to the top tier stop relay S1, such circuit including normally open contacts BA and AB which have been closed, and a pair of normally closed contacts AC and AD. As previously described, energization of relay S1 causes the drive motor 112 for the top tier 84 to reverse, whereby the tier is stopped in the manner described earlier herein with the desired tool in the tool change position TC.

In addition to the foregoing, circuits are completed from the supply line 340 to the microswitches 140' and 140" which correspond with the center tier 84' and the bottom tier 84", respectively. The circuit to microswitch 140' includes normally open contacts BA and AB which have been closed, and a normally closed contact AD. The circuit to microswitch 140" includes normally open contacts BA and AB which have been closed, and normally closed contact AC. The circuit to microswitch 140 is not completed since it includes normally closed contacts AB which have now been opened. With microswitch 140' energized, the center tier 84' continues to be driven in a forward direction until the latch mechanism 136' thereon engages and closes microswitch 140', whereupon center tier home relay S5 is operated so as to reverse the center tier drive motor 112' and stop the center tier with its peripheral opening 146' in vertical alignment with the tool in the tool change position TC. (The reason for providing for such alignment has been explained earlier herein, although it will be understood that when as in the present example the desired tool is in the upper tier, it is actually not necessary that the lower tiers be aligned.) Similarly, with the microswitch 140" energized, the lower tier 84" will continue to be driven in a forward direction until the latch mechanism 136" thereon engages and closes microswitch 140", whereupon the lower tier home relay S6 will be operated to stop the lower tier with its peripheral opening 146" in vertical alignment with the tool in the tool change position.

The purpose of the double check circuit of FIGURE 15b is to verify that the proper tool has been positioned in the tool change position TC. As described earlier herein, when the drive motor 112 is reversed, the upper tier 84 will coast somewhat past the desired stop position and will then return thereto. Therefore, the code key cartridge 94 corresponding with the desired tool will pass through the reader head 152 for the upper tier, and will then pass slightly beyond the reader head, after which the cartridge will return to the reader head and stop therein, unless due to error the upper tier 84 coasts too far and goes to the next index position. If the latter should happen, the double check circuit senses it and starts the search cycle over.

When in the example being described the cartridge 94 corresponding to tool code number 10,000 first engages the reader head 152, relay AB is energized and the above-described operations take place, and when the cartridge 94 coasts past the reader head, relay AB is denergized. However, the initial operation of relay AB (with the resulting operation of relay BA in the double check circuit) caused normally open contact $BA_1$ in the double check circuit to close, thus completing a separate circuit through such contact to relays BD and BA. Thus normally open contact $BA_1$ remains closed and normally closed contact $BA_2$ remains open even after the relay AB associated with logic unit 316 is deenergized. Consequently, when the cartridge 94 coasts past the reader head and deenergizes relay AB, the relays BD and BA remain energized (although relay BD does not operate since it has a five second time delay), and because normally closed contact $BA_2$ is open, relay BC is deenergized. Note that the energization of relay BA is not lost when the cartridge 94 coasts past the reader head 152, due to the fact that contact $BA_1$ will close before contact $BA_2$ opens, and thus the alternate circuit to relays BD and BA is completed before the first circuit is broken.

The time delays for the relays BC and BD in the double check circuit must be determined in accordance with the time required for the matrix tier holding the desired tool to coast, return to proper position, and stop. It should be assumed for purposes of the embodiment being described that after coincidence is first sensed, the tier 84 will reverse and stop within less than three seconds i.e., relay AB is energized, and it is then deenergized due to coasting of the matrix tier, but if the matrix tier is stopped in the proper position the relay AB will be energized a second time in less than three seconds. In such a case, when coincidence is established for the second time and relay AB is again energized, a circuit will again be completed to relay BC in the double check circuit in less than three seconds, and since relay BC has a two second time delay, it will necessarily operate before the relay BD having the five second time delay, even though the latter has been in the circuit since the first coincidence. Consequently, in the usual situation relay BC will operate to open normally closed contact BC and thereby deenergize relay BD. Thus, relay BD will not operate, there will be verification that the proper tool is in fact stopped in the tool change position TC, and the search will stop.

On the other hand, if the matrix tier 84 should coast too far to the next index position, then relay AB will not be energized the second time when the tier reverses and stops (since the logic unit 316 will not sense coincidence), and thus relay BC in the double check circuit will remain deenergized, whereby after the time delay of five seconds expires from the time that coincidence was first sensed, relay BD will operate. When relay BD operates it opens normally closed contact BD in the circuit of relay BA, and it starts the search all over again, i.e., relay BD is associated with the solenoid-operated valves 122, 122' and 122" for the drive motors 112, 112' and 112" so that when it operates it will move all of the valves to forward positions and thereby cause all three matrix tiers 84, 84' and 84" to again be rotated in the forward direction.

Referring again to the usual situation where the proper tool is stopped in the tool change position TC and relay BC in the double check circuit operates to disconnect relay BD, the next step is to begin the tool changing cycle wherein the desired new tool is removed from the matrix VIII by the vertical shuttle IX. Such a tool change cycle may be initiated by the relay BC which will send a signal to initiate operation of the shuttle drive motor 174. In order to control vertical movement of the shuttle carriage 170, one of the previously described shot pins is actuated to operative position if the desired tool is in the upper tier 84 or the center tier 84', and such shot pins may be actuated by the relays AB and AC. Thus, when the desired tool is in the upper tier 84, the relay AB will operate the hydraulic cylinder 180 so as to actuate the shot pin 194 corresponding to such tier, and relay AB will also cause the shuttle microswitch 192 to be rendered operative to effect slowing down of the carriage 170 before it reaches the shot pin 194.

There has been described above the operation of the double check circuit of FIGURE 15b to provide verification that the desired tool has in fact been stopped in the tool change position TC and to start the search over if such is not the case. It will be understood that it may also be desirable to provide for verification that the other two tiers which do not hold the desired tool are stopped in the proper home position with their peripheral openings in alignment with the tool change position. If desired, such verification can be accomplished by providing time delay means in conjunction with the relays S4, S5 and S6, whereby for example relay S4 is operated when microswitch 140 is actuated, but such relay will deenergize and cause the corresponding tier 84 to be driven forwardly again unless the microswitch is actuated again within a predetermined time.

Still referring to the operation of the control system of the present invention, once the relay BC in the double check circuit operates and sends a signal to initiate the operation of the shuttle drive motor 174, the shuttle carriage 170 in accordance with the present example will move upwardly until the stop finger 182 engages the shot pin 194 corresponding with the upper tier 84, and in response to actuation of the shuttle microswitch 192 the gripping means 198 will then pivot in and grip the tool in the tool change position in the manner earlier described and move upwardly with such tool. Once the vertical shuttle IX has transported the new tool upwardly beyond the upper tier 84, the carriage 170 will engage a switch (not shown) to effect operation of circuit transfer relay YY. As earlier described, circuit transfer relay YY will cause the information in the second storage relays 308 to be transmitted to the three logic units 316, 318, and 320, which information will correspond with the code number of the old tool which is to be returned to the matrix VIII. It will be noted from FIGURE 15b that among the contacts 346 there is a normally open contact 346YY, so that a circuit will be completed to the relay Z which (after its one second time delay) will operate to initiate the forward rotation of the three tiers 84, 84' and 84", thereby to initiate the search for the empty socket 98 corresponding to the old tool.

The search for the empty matrix socket 98 for the old tool is substantially the same as the search for the new tool described hereinabove, and thus one of the three logic units 316, 318 or 320 will sense coincidence when the proper socket 98 is in the tool change position TC, whereupon the tier containing such socket will be stopped, and the other two tiers will be stopped with their peripheral openings in vertical alignment therewith. The double check circuit operates in the same manner as when searching for a new tool, and thus when there is verification that the proper socket 98 is stopped in the tool change position TC, the relay BC will operate. Once a tool which has been removed from the spindle III is transferred to the vertical shuttle and is held by the latter in the position shown in dash lines in FIGURE 2 so as to operate microswitch 211, relay BC is effective to signal the shuttle drive motor 174 so as to cause the carriage 170 and gripping means 198 to move downwardly and return the old tool to the matrix. The shuttle gripping means 198 will thus return the old tool and then pivot away from the matrix, at which time it will operate a switch (not shown) which as mentioned earlier may be in combination with four relays (not shown) connected in parallel and each having a different time delay so as to effect four operations in sequence. Such four operations comprise opening normally closed contact X to dump the second storage means 308, energizing storage transfer relay XX to transfer the information in the first storage means 302 to the second storage means 308, opening normally closed contact Y to dump the first storage means 302, and deenergizing circuit transfer relay YY so that the first storage means 302 will again be conditioned to supply information to the three coincidence logic units 316, 318 and 320.

While certain preferred forms of the invention have been described and illustrated, it will be appreciated that modifications and changes may be made therein by those skilled in the art, particularly with the present disclosure before them, and thus we do not intend to be limited to the particular disclosure, except insofar as the appended claims are so limited.

We claim:

1. For use in an automatic tool changing system for a machine tool, in combination, a first tool storage tier member having a plurality of tool holding means thereon for holding a first group of tools in vertically disposed positions, a second tool storage tier member having a plurality of tool holding means thereon for holding a second group of tools in vertically disposed positions, said first and second tiers being mounted one above the other for rotation about a common vertical axis, means for rotating said tiers to bring a selected tool therein to a predetermined tool change position corresponding to the tier in which the selected tool is located, vertically movable shuttle means common to said first and second tiers including gripping means for gripping a selected tool in a tool change position in one of said tiers and transferring the same therefrom, said gripping means being rotatable about a horizontal axis, means responsive to the location of a selected tool for moving said shuttle to an operative vertical position adjacent the particular tier in which a selected tool is located, and means operative after said selected tool has been moved away from said tier member by said shuttle for rotating said gripping means about said horizontal axis so as to dispose said selected tool in a horizontal position.

2. For use in an automatic tool changing system for a machine tool, in combination, a first tool storage tier member having a plurality of tool sockets for holding a first group of tools in vertically disposed positions therein, a second tool storage tier member having a plurality of tool sockets for holding a second group of tools in vertically disposed positions therein, said first and second tiers being mounted one above the other for rotation independently of one another about a common vertical axis, first drive means for rotating said first tier, second drive means for rotating said second tier, said first and second drive means being operable independently of one another and adapted to rotate said tiers to bring a selected tool therein to a predetermined tool change position corresponding to the tier in which the selected tool is located, vertically movable shuttle means common to said first and second tiers including gripping means for gripping a selected tool in a tool change position in one of said tiers and transferring the same therefrom, said gripping means being rotatable about a horizontal axis, means responsive to the location of a selected tool for moving said shuttle to an operative vertical position adjacent the particular tier in which a selected tool is located, and means operative after said selected tool has been moved away from said tier members by said shuttle for rotating said gripping means about said horizontal axis so as to dispose said selected tool in a horizontal position.

3. The invention of claim 2 wherein said vertically movable shuttle is also mounted for pivotal movement about a vertical axis between a first pivotal position wherein said gripping means is adapted to grip a tool disposed in a tool change position in one of said tiers and a second pivotal position wherein said gripping means is disposed away from said tiers.

4. For use in an automatic tool changing system for a machine tool, a tool storage member comprising, in combination, a first tier member having a plurality of tool holding means thereon for holding a first group of tools, a second tier member having a plurality of tool holding means thereon for holding a second group of tools, said first and second tiers being mounted for rotation independently of one another about a common axis, an opening formed in said second tier large enough to permit a selected tool removed from said first tier to be passed therethrough, first drive means for rotating said first tier, second drive means for rotating said second tier, said first and second drive means being operable independently of one another, first stopping means for stopping said first tier to bring a selected tool therein to a predetemined tool change position, second stopping means including a normally inoperative switch for stopping said second tier to align said opening therein with said predetermined tool change position, switch-actuating means mounted on said second tier for actuating said switch during each revolution of said tier, and means operative upon location of a selected tool in said first tier for initiating the operation of said first stopping means and for rendering said switch operative whereby said first tier will be stopped with said selected tool in said predetermined tool change position, and upon the next actuation of said switch by said switch-actuating means said second tier will be stopped with said opening in alignment with said tool change position.

5. For use in an automatic tool changing system for a machine tool, a tool storage member comprising, in combination, a first tier member having a plurality of tool sockets for holding a first group of tools in vertically disposed positions therein, a second tier member having a plurality of tool sockets for holding a second group of tools in vertically disposed positions therein, said first and second tiers being mounted one above the other for rotation independently of one another about a common vertical axis, an opening formed in the upper one of said tiers large enough to permit a selected tool removed from the lower one of said tiers to be passed upwardly therethrough, first drive means for rotating said first tier, a second drive means for rotating said second tier, said first and second drive means being operable independently of one another, lower tier stopping means for stopping said lower tier to bring a selected tool therein to a predetermined tool change position, upper tier stopping means including a normally inoperative switch for stopping said upper tier to align said opening therein with said predetermined tool change position, switch-actuating means mounted on said upper tier for actuating said switch during each revolution of said tier, and means operative upon location of a selected tool in said lower tier for initiating the operation of said lower tier stopping means and for rendering said switch operative whereby said lower tier will be stopped with said selected tool in said predetermined tool change position, and upon the next actuation of said switch by said switch-actuating means said upper tier will be stopped with said opening in alignment with said tool change position.

6. For use in an automatic tool changing system for a machine tool, in combination, a first lower tool storage tier member having a plurality of tool holding means thereon for holding a first group of tools, a second upper tool storage tier member having a plurality of tool holding means thereon for holding a second group of tools, said first and second tiers being mounted one above the other for rotation about a common vertical axis, means for rotating said tiers to bring a selected tool therein to a predetermined tool change position corresponding to the tier in which the selected tool is located, first sensing means associated with said lower storage tier for sensing when a selected tool is located therein, second sensing means associated with said upper storage tier for sensing when a selected tool is located therein, vertically movable shuttle means common to said first and second tiers for transferring a selected tool from a tool change position in one of said tiers, stop means associated with said vertically movable shuttle and positioned to stop the latter at an operative vertical position adjacent the upper one of said tiers, and means responsive to the operation of said second sensing means for rendering said stop means operative.

7. For use in an automatic tool changing system for a machine tool, in combination, a first lower tool storage tier member having a plurality of tool sockets for holding a first group of tools in vertically disposed positions therein, a second upper tool storage tier member having a plurality of tool sockets for holding a second group of tools in vertically disposed positions therein, said first and second tiers being mounted one above the other for rotation independently of one another about a common vertical axis, first drive means for rotating said lower tier, second drive means for rotating said upper tier, said first and second drive means being operable independently of one another and adapted to rotate said tiers to bring a selected tool therein to a predetermined tool change position corresponding to the tier in which the selected tool is located, first sensing means associated with said lower storage tier for sensing when a selected tool is located therein, second sensing means associated with said upper storage tier for sensing when a selected tool is located therein, vertically movable shuttle means common to said first and second tiers for transferring a selected tool from a tool change position in one of said tiers, stop means associated with said vertically movable shuttle and positioned to stop the latter at an operative vertical position adjacent the upper one of said tiers, and means responsive to the operation of said second sensing means for rendering said stop means operative.

8. For use in conjunction with a tool storage member in an automatic tool changing system for a machine tool, shuttle mechanism comprising, in combination, a stationary vertical support, vertical guide means, a carriage mounted for vertical movement along said guide means, drive means for moving said carriage upwardly and downwardly along said guide means, a housing mounted on said carriage for pivotal movement thereon about a vertical axis, gripping means on said housing for gripping a tool, a rotary drive shaft disposed vertically and extending substantially the full length of the shuttle mechanism, said drive shaft being arranged so as to pass through said vertically movable carriage, means carried by said carriage for providing a driving connection between said rotary drive shaft and said housing for rotating the latter, and means for rotating said rotary drive shaft so as to rotate said housing between a first pivotal position wherein said gripping means is adapted to grip a tool in said tool storage member and a second pivotal position wherein said gripping means is disposed away from said storage member.

9. For use in conjunction with a tool storage member in an automatic tool changing system for a machine tool, shuttle mechanism comprising, in combination, a stationary vertical support, vertical guide means, a carriage mounted for vertical movement along said guide means, first drive means for moving said carriage upwardly and downwardly along said guide means, a housing mounted on said carriage for pivotal movement thereon about a vertical axis, gripping means for gripping a tool, said gripping means being mounted on said housing for pivotal movement thereon about a horizontal axis, second drive means for rotating said housing between a first pivotal position wherein said gripping means is adapted to grip a tool in said tool storage member and a second pivotal position wherein said gripping means is disposed away from said storage member, and third drive means for rotating said gripping means about said horizontal axis.

10. For use in conjunction with a tool storage member in an automatic tool changing system for a machine tool, shuttle mechanism comprising, in combination, a stationary vertical support, vertical guide means, a carriage mounted for vertical movement along said guide means, drive means for moving said carriage upwardly and downwardly along said guide means, a housing mounted on said carriage for pivotal movement thereon about a vertical axis, gripping means for gripping a tool, said gripping means being mounted on said housing for pivotal movement thereon about a horizontal axis, a rotary drive shaft disposed vertically and extending substantially the full length of the shuttle mechanism, said drive shaft being arranged so as to pass through said vertically movable carriage, means carried by said carriage for providing a driving connection between said rotary drive shaft and said housing for rotating the latter, means for rotating said rotary drive shaft so as to rotate said housing between a first pivotal position wherein said gripping means is adapted to grip a tool in said tool storage member and a second pivotal position wherein said gripping means is disposed away from said storage member, and drive means for rotating said gripping means about said horizontal axis.

11. For use in conjunction with a tool storage member in an automatic tool changing system for a machine tool, shuttle mechanism comprising, in combination, a stationary vertical support, vertical guide means, a carriage mounted for vertical movement along said guide means, first drive means for moving said carriage upwardly and downwardly along said guide means, a housing mounted on said carriage for pivotal movement thereon about a vertical axis, gripping means for gripping a tool, said gripping means being mounted on said housing for pivotal movement thereon about a horizontal axis, second drive means for rotating said housing between a first pivotal position wherein said gripping means is adapted to grip a tool in said tool storage member and a second pivotal position wherein said gripping means is disposed away from said storage member, and third drive means for rotating said gripping means about said horizontal axis, said third drive means being responsive to rotation of said housing about said vertical axis whereby said rotation of said housing about said vertical axis and said rotation of said gripping means about said horizontal axis will occur simultaneously.

12. The invention of claim 11 wherein said third drive means includes rack and pinion means for rotating said gripping means about said horizontal axis, and cam means operable in response to rotation of said housing about said vertical axis for actuating said rack and pinion means.

No references cited.

RICHARD H. EANES, JR., *Primary Examiner.*